United States Patent
Scott et al.

(10) Patent No.: US 10,701,038 B2
(45) Date of Patent: Jun. 30, 2020

(54) CONTENT NEGOTIATION IN A CONTENT CENTRIC NETWORK

(71) Applicant: CISCO TECHNOLOGY, INC., San Jose, CA (US)

(72) Inventors: Glenn C. Scott, Los Altos, CA (US); Christopher A. Wood, Newport Beach, CA (US); Ignacio Solis, Scotts Valey, CA (US)

(73) Assignee: Cisco Technology, Inc., San Jose, CA (US)

(*) Notice: Subject to any disclaimer, the term of this patent is extended or adjusted under 35 U.S.C. 154(b) by 558 days.

(21) Appl. No.: 14/810,159

(22) Filed: Jul. 27, 2015

(65) Prior Publication Data

US 2017/0034240 A1 Feb. 2, 2017

(51) Int. Cl.
| | | |
|---|---|---|
| H04L 29/06 | (2006.01) | |
| H04L 29/08 | (2006.01) | |
| H04L 12/773 | (2013.01) | |
| H04N 21/2343 | (2011.01) | |

(52) U.S. Cl.
CPC ......... *H04L 63/0428* (2013.01); *H04L 45/60* (2013.01); *H04L 65/4084* (2013.01); *H04L 67/02* (2013.01); *H04L 67/1097* (2013.01); *H04L 67/28* (2013.01);
(Continued)

(58) Field of Classification Search
CPC ..... H04L 67/02; H04L 45/60; H04L 63/0428; H04L 63/4084; H04L 67/1097; H04L 67/28; H04L 67/2842; H04L 67/327; H04L 67/2847; H04L 67/102; H04L 65/4084; H04N 21/23439
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |

(Continued)

FOREIGN PATENT DOCUMENTS

| | | | | |
|---|---|---|---|---|
| CN | 103873371 | | 6/2014 | |
| CN | 104052667 A | * | 9/2014 | ............. H04L 45/72 |

(Continued)

OTHER PUBLICATIONS

Google Translation of CN104052667A.*
(Continued)

*Primary Examiner* — Luu T Pham
*Assistant Examiner* — James J Wilcox

(57) ABSTRACT

One embodiment provides a system that facilitates content negotiation in a content centric network. During operation, the system receives, by a content producing device, a packet that corresponds to a first interest, wherein an encoded name for the interest indicates a plurality of qualifiers for acceptable types of requested content, and wherein a name is a hierarchically structured variable length identifier which comprises contiguous name components. The system generates a first content object that satisfies one of the indicated plurality of qualifiers, wherein a name for the content object is the encoded name, and wherein a content object indicates data and a content type corresponding to the satisfied qualifier.

20 Claims, 12 Drawing Sheets

(52) U.S. Cl.
CPC ........ *H04L 67/2842* (2013.01); *H04L 67/327* (2013.01); *H04N 21/23439* (2013.01); *H04L 67/2847* (2013.01)

(56) References Cited

U.S. PATENT DOCUMENTS

| | | | |
|---|---|---|---|
| 5,070,134 A | 12/1991 | Oyamada | |
| 5,110,856 A | 5/1992 | Oyamada | |
| 5,214,702 A | 5/1993 | Fischer | |
| 5,377,354 A | 12/1994 | Scannell | |
| 5,506,844 A | 4/1996 | Rao | |
| 5,629,370 A | 5/1997 | Freidzon | |
| 5,845,207 A | 12/1998 | Amin | |
| 5,870,605 A | 2/1999 | Bracho | |
| 6,021,464 A | 2/2000 | Yao | |
| 6,047,331 A | 4/2000 | Medard | |
| 6,052,683 A | 4/2000 | Irwin | |
| 6,085,320 A | 7/2000 | Kaliski, Jr. | |
| 6,091,724 A | 7/2000 | Chandra | |
| 6,128,623 A | 10/2000 | Mattis | |
| 6,128,627 A | 10/2000 | Mattis | |
| 6,173,364 B1 | 1/2001 | Zenchelsky | |
| 6,209,003 B1 | 3/2001 | Mattis | |
| 6,226,618 B1 | 5/2001 | Downs | |
| 6,233,617 B1 | 5/2001 | Rothwein | |
| 6,233,646 B1 | 5/2001 | Hahm | |
| 6,289,358 B1 | 9/2001 | Mattis | |
| 6,292,880 B1 | 9/2001 | Mattis | |
| 6,332,158 B1 | 12/2001 | Risley | |
| 6,363,067 B1 | 3/2002 | Chung | |
| 6,366,988 B1 | 4/2002 | Skiba | |
| 6,574,377 B1 | 6/2003 | Cahill | |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,732,273 B1 | 5/2004 | Byers | |
| 6,769,066 B1 | 7/2004 | Botros | |
| 6,772,333 B1 | 8/2004 | Brendel | |
| 6,775,258 B1 | 8/2004 | vanValkenburg | |
| 6,834,272 B1 | 12/2004 | Naor | |
| 6,862,280 B1 | 3/2005 | Bertagna | |
| 6,901,452 B1 | 5/2005 | Bertagna | |
| 6,915,307 B1 | 7/2005 | Mattis | |
| 6,917,985 B2 | 7/2005 | Madruga | |
| 6,957,228 B1 | 10/2005 | Graser | |
| 6,968,393 B1 | 11/2005 | Chen | |
| 6,981,029 B1 | 12/2005 | Menditto | |
| 7,007,024 B2 | 2/2006 | Zelenka | |
| 7,013,389 B1 | 3/2006 | Srivastava | |
| 7,031,308 B2 | 4/2006 | Garcia-Luna-Aceves | |
| 7,043,637 B2 | 5/2006 | Bolosky | |
| 7,061,877 B1 | 6/2006 | Gummalla | |
| 7,080,073 B1 | 7/2006 | Jiang | |
| RE39,360 E | 10/2006 | Aziz | |
| 7,149,750 B2 | 12/2006 | Chadwick | |
| 7,152,094 B1 | 12/2006 | Jannu | |
| 7,177,646 B2 | 2/2007 | ONeill | |
| 7,206,860 B2 | 4/2007 | Murakami | |
| 7,206,861 B1 | 4/2007 | Callon | |
| 7,210,326 B2 | 5/2007 | Kawamoto | |
| 7,233,948 B1 | 6/2007 | Shamoon | |
| 7,246,159 B2 | 7/2007 | Aggarwal | |
| 7,257,837 B2 | 8/2007 | Xu | |
| 7,287,275 B2 | 10/2007 | Moskowitz | |
| 7,315,541 B1 | 1/2008 | Housel | |
| 7,339,929 B2 | 3/2008 | Zelig | |
| 7,350,229 B1 | 3/2008 | Lander | |
| 7,362,727 B1 | 4/2008 | ONeill | |
| 7,382,787 B1 | 6/2008 | Barnes | |
| 7,395,507 B2 | 7/2008 | Robarts | |
| 7,430,755 B1 | 9/2008 | Hughes | |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,535,926 B1 | 5/2009 | Deshpande | |
| 7,542,471 B2 | 6/2009 | Samuels | |
| 7,543,064 B2 | 6/2009 | Juncker | |
| 7,552,233 B2 | 6/2009 | Raju | |
| 7,555,482 B2 | 6/2009 | Korkus | |
| 7,555,563 B2 | 6/2009 | Ott | |
| 7,564,812 B1 | 7/2009 | Elliott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,636,767 B2 | 12/2009 | Lev-Ran | |
| 7,647,507 B1 | 1/2010 | Feng | |
| 7,660,324 B2 | 2/2010 | Oguchi | |
| 7,685,290 B2 | 3/2010 | Satapati | |
| 7,693,959 B2 * | 4/2010 | Leighton | H04L 29/06 709/217 |
| 7,698,463 B2 | 4/2010 | Ogier | |
| 7,698,559 B1 | 4/2010 | Chaudhury | |
| 7,769,887 B1 | 8/2010 | Bhattacharyya | |
| 7,779,467 B2 | 8/2010 | Choi | |
| 7,801,069 B2 | 9/2010 | Cheung | |
| 7,801,177 B2 | 9/2010 | Luss | |
| 7,816,441 B2 | 10/2010 | Elizalde | |
| 7,831,733 B2 | 11/2010 | Sultan | |
| 7,873,619 B1 | 1/2011 | Faibish | |
| 7,908,337 B2 | 3/2011 | Garcia-Luna-Aceves | |
| 7,924,837 B1 | 4/2011 | Shabtay | |
| 7,930,264 B2 * | 4/2011 | Geppert | G06F 21/31 706/47 |
| 7,953,014 B2 | 5/2011 | Toda | |
| 7,953,885 B1 | 5/2011 | Devireddy | |
| 7,979,912 B1 | 7/2011 | Roka | |
| 8,000,267 B2 | 8/2011 | Solis | |
| 8,010,691 B2 | 8/2011 | Kollmansberger | |
| 8,069,023 B1 | 11/2011 | Frailong | |
| 8,074,289 B1 | 12/2011 | Carpentier | |
| 8,117,441 B2 | 2/2012 | Kurien | |
| 8,160,069 B2 | 4/2012 | Jacobson | |
| 8,204,060 B2 | 6/2012 | Jacobson | |
| 8,214,364 B2 | 7/2012 | Bigus | |
| 8,224,985 B2 | 7/2012 | Takeda | |
| 8,225,057 B1 | 7/2012 | Zheng | |
| 8,239,331 B2 | 8/2012 | Shanmugavelayutham | |
| 8,271,578 B2 | 9/2012 | Sheffi | |
| 8,271,687 B2 | 9/2012 | Turner | |
| 8,312,064 B1 | 11/2012 | Gauvin | |
| 8,332,357 B1 | 12/2012 | Chung | |
| 8,375,420 B2 | 2/2013 | Farrell | |
| 8,386,622 B2 | 2/2013 | Jacobson | |
| 8,447,851 B1 | 5/2013 | Anderson | |
| 8,462,781 B2 | 6/2013 | McGhee | |
| 8,467,297 B2 | 6/2013 | Liu | |
| 8,473,633 B2 | 6/2013 | Eardley | |
| 8,553,562 B2 | 10/2013 | Allan | |
| 8,572,214 B2 | 10/2013 | Garcia-Luna-Aceves | |
| 8,645,702 B2 | 2/2014 | Zhang et al. | |
| 8,654,649 B2 | 2/2014 | Vasseur | |
| 8,665,757 B2 | 3/2014 | Kling | |
| 8,667,172 B2 | 3/2014 | Ravindran | |
| 8,677,451 B1 | 3/2014 | Bhimaraju | |
| 8,688,619 B1 | 4/2014 | Ezick | |
| 8,699,350 B1 | 4/2014 | Kumar | |
| 8,718,055 B2 | 5/2014 | Vasseur | |
| 8,750,820 B2 | 6/2014 | Allan | |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,767,627 B2 | 7/2014 | Ezure | |
| 8,817,594 B2 | 8/2014 | Gero | |
| 8,826,381 B2 | 9/2014 | Kim | |
| 8,832,302 B1 | 9/2014 | Bradford | |
| 8,836,536 B2 | 9/2014 | Marwah | |
| 8,861,356 B2 | 10/2014 | Kozat | |
| 8,862,774 B2 | 10/2014 | Vasseur | |

(56) References Cited

U.S. PATENT DOCUMENTS

| | | |
|---|---|---|
| 8,868,779 B2 | 10/2014 | ONeill |
| 8,874,842 B1 | 10/2014 | Kimmel |
| 8,880,587 B2 | 11/2014 | Cobb et al. |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 8,977,704 B2 | 3/2015 | Liu et al. |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,276,922 B2* | 3/2016 | Mosko ............... H04L 63/08 |
| 9,280,610 B2 | 3/2016 | Gruber |
| 9,531,679 B2* | 12/2016 | Uzun ............... H04L 63/0428 |
| 9,602,596 B2* | 3/2017 | Mosko ............... H04L 67/104 |
| 9,621,354 B2* | 4/2017 | Mosko ............... H04L 9/3247 |
| 9,699,198 B2* | 7/2017 | Solis ............... H04L 63/123 |
| 9,712,649 B2* | 7/2017 | Lopez ............... H04L 69/166 |
| 9,736,263 B2* | 8/2017 | Royon ............... H04L 67/2847 |
| 9,762,490 B2* | 9/2017 | Valencia Lopez .... H04L 45/745 |
| 9,946,743 B2* | 4/2018 | Mosko ............... G06F 16/289 |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Paterka |
| 2003/0193967 A1* | 10/2003 | Fenton ............... H04L 29/06 370/490 |
| 2003/0229892 A1 | 12/2003 | Sardera |
| 2004/0010507 A1* | 1/2004 | Bellew ............ G06F 17/30392 |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156726 A1* | 7/2007 | Levy ............... G06F 17/3002 |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1* | 3/2008 | Bergstrom ......... H04N 7/17318 709/224 |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |

(56) References Cited

U.S. PATENT DOCUMENTS

| | | |
|---|---|---|
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1* | 11/2009 | Stewart ............... H04L 65/1069 370/389 |
| 2009/0287835 A1* | 11/2009 | Jacobson ............... H04L 67/104 709/229 |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1* | 8/2010 | Jacobson ............... H04L 45/00 370/392 |
| 2010/0195654 A1 | 8/2010 | Jacobson |
| 2010/0195655 A1 | 8/2010 | Jacobson |
| 2010/0198687 A1* | 8/2010 | Bang ............... G06F 21/10 705/14.53 |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1* | 4/2011 | Jacobson ............... H04L 45/745 370/392 |
| 2011/0106755 A1 | 5/2011 | Hao |
| 2011/0119394 A1* | 5/2011 | Wang ............... H04N 21/23439 709/231 |
| 2011/0125874 A1* | 5/2011 | Park ............... H04N 21/25891 709/219 |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0276630 A1* | 11/2011 | Ekblom ............... H04L 67/104 709/204 |
| 2011/0280214 A1* | 11/2011 | Lee ............... H04W 36/023 370/331 |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |

(56) References Cited

U.S. PATENT DOCUMENTS

| | | | |
|---|---|---|---|
| 2012/0047361 A1 | 2/2012 | Erdmann | |
| 2012/0066727 A1 | 3/2012 | Nozoe | |
| 2012/0079056 A1 | 3/2012 | Turányi | |
| 2012/0102136 A1 | 4/2012 | Srebrny | |
| 2012/0106339 A1 | 5/2012 | Mishra | |
| 2012/0110159 A1 | 5/2012 | Richardson | |
| 2012/0114313 A1 | 5/2012 | Phillips | |
| 2012/0120803 A1 | 5/2012 | Farkas | |
| 2012/0127994 A1 | 5/2012 | Ko | |
| 2012/0136676 A1 | 5/2012 | Goodall | |
| 2012/0136936 A1 | 5/2012 | Quintuna | |
| 2012/0136945 A1 | 5/2012 | Lee | |
| 2012/0137367 A1 | 5/2012 | Dupont | |
| 2012/0141093 A1 | 6/2012 | Yamaguchi | |
| 2012/0155348 A1* | 6/2012 | Jacobson | H04L 12/10 370/311 |
| 2012/0155464 A1 | 6/2012 | Kim | |
| 2012/0158973 A1 | 6/2012 | Jacobson | |
| 2012/0163373 A1 | 6/2012 | Lo | |
| 2012/0166433 A1 | 6/2012 | Tseng | |
| 2012/0170913 A1 | 7/2012 | Isozaki | |
| 2012/0179653 A1 | 7/2012 | Araki | |
| 2012/0197690 A1 | 8/2012 | Agulnek | |
| 2012/0198048 A1 | 8/2012 | Ioffe | |
| 2012/0221150 A1 | 8/2012 | Arensmeier | |
| 2012/0224487 A1 | 9/2012 | Hui | |
| 2012/0226902 A1 | 9/2012 | Kim | |
| 2012/0257500 A1 | 10/2012 | Lynch | |
| 2012/0284371 A1* | 11/2012 | Begen | H04L 65/1069 709/219 |
| 2012/0284791 A1 | 11/2012 | Miller | |
| 2012/0290669 A1 | 11/2012 | Parks | |
| 2012/0290919 A1 | 11/2012 | Melnyk | |
| 2012/0291102 A1 | 11/2012 | Cohen | |
| 2012/0300669 A1 | 11/2012 | Zahavi | |
| 2012/0307629 A1 | 12/2012 | Vasseur | |
| 2012/0314580 A1 | 12/2012 | Hong | |
| 2012/0317307 A1 | 12/2012 | Ravindran | |
| 2012/0317655 A1 | 12/2012 | Zhang | |
| 2012/0322422 A1 | 12/2012 | Frecks | |
| 2012/0323933 A1 | 12/2012 | He | |
| 2012/0331112 A1 | 12/2012 | Chatani | |
| 2013/0016695 A1* | 1/2013 | Ravindran | H04L 67/327 370/331 |
| 2013/0024560 A1 | 1/2013 | Vasseur | |
| 2013/0029664 A1* | 1/2013 | Lee | H04L 67/32 455/435.1 |
| 2013/0041982 A1 | 2/2013 | Shi | |
| 2013/0051392 A1 | 2/2013 | Filsfils | |
| 2013/0054971 A1 | 2/2013 | Yamaguchi | |
| 2013/0060962 A1 | 3/2013 | Wang | |
| 2013/0061084 A1 | 3/2013 | Barton | |
| 2013/0066823 A1 | 3/2013 | Sweeney | |
| 2013/0073552 A1 | 3/2013 | Rangwala | |
| 2013/0073882 A1 | 3/2013 | Inbaraj | |
| 2013/0074155 A1* | 3/2013 | Huh | H04L 63/065 726/3 |
| 2013/0090942 A1 | 4/2013 | Robinson | |
| 2013/0091237 A1 | 4/2013 | Ambalavanar | |
| 2013/0091539 A1 | 4/2013 | Khurana | |
| 2013/0110987 A1 | 5/2013 | Kim | |
| 2013/0111063 A1 | 5/2013 | Lee | |
| 2013/0128786 A1 | 5/2013 | Sultan | |
| 2013/0132719 A1 | 5/2013 | Kobayashi | |
| 2013/0139245 A1 | 5/2013 | Thomas | |
| 2013/0151584 A1 | 6/2013 | Westphal | |
| 2013/0151646 A1 | 6/2013 | Chidambaram | |
| 2013/0152070 A1 | 6/2013 | Bhullar | |
| 2013/0163426 A1 | 6/2013 | Beliveau | |
| 2013/0166668 A1 | 6/2013 | Byun | |
| 2013/0173822 A1 | 7/2013 | Hong | |
| 2013/0182568 A1 | 7/2013 | Lee | |
| 2013/0182931 A1 | 7/2013 | Fan | |
| 2013/0185406 A1 | 7/2013 | Choi | |
| 2013/0191412 A1 | 7/2013 | Kitamura | |
| 2013/0197698 A1 | 8/2013 | Shah | |
| 2013/0198119 A1 | 8/2013 | Eberhardt, III | |
| 2013/0198351 A1* | 8/2013 | Widjaja | H04L 67/2842 709/223 |
| 2013/0212185 A1 | 8/2013 | Pasquero | |
| 2013/0219038 A1 | 8/2013 | Lee | |
| 2013/0219081 A1* | 8/2013 | Qian | H04L 67/327 709/241 |
| 2013/0219478 A1 | 8/2013 | Mahamuni | |
| 2013/0223237 A1 | 8/2013 | Hui | |
| 2013/0227048 A1 | 8/2013 | Xie | |
| 2013/0227114 A1 | 8/2013 | Vasseur | |
| 2013/0227166 A1 | 8/2013 | Ravindran | |
| 2013/0242996 A1 | 9/2013 | Varvello | |
| 2013/0250809 A1 | 9/2013 | Hui | |
| 2013/0262365 A1 | 10/2013 | Dolbear | |
| 2013/0262698 A1 | 10/2013 | Schwan | |
| 2013/0275464 A1* | 10/2013 | Kim | H04L 67/06 707/769 |
| 2013/0275544 A1 | 10/2013 | Westphal | |
| 2013/0275618 A1* | 10/2013 | Puttaswamy Naga | H04L 67/2842 709/236 |
| 2013/0282854 A1 | 10/2013 | Jang | |
| 2013/0282860 A1 | 10/2013 | Zhang | |
| 2013/0282920 A1 | 10/2013 | Zhang | |
| 2013/0304711 A1* | 11/2013 | Resch | H04L 67/1097 707/690 |
| 2013/0304758 A1 | 11/2013 | Gruber | |
| 2013/0304937 A1 | 11/2013 | Lee | |
| 2013/0325888 A1 | 12/2013 | Oneppo | |
| 2013/0329696 A1 | 12/2013 | Xu | |
| 2013/0332971 A1 | 12/2013 | Fisher | |
| 2013/0336103 A1 | 12/2013 | Vasseur | |
| 2013/0336323 A1 | 12/2013 | Srinivasan | |
| 2013/0339481 A1 | 12/2013 | Hong | |
| 2013/0343408 A1 | 12/2013 | Cook | |
| 2014/0003232 A1 | 1/2014 | Guichard | |
| 2014/0003424 A1 | 1/2014 | Matsuhira | |
| 2014/0006354 A1 | 1/2014 | Parkison | |
| 2014/0006565 A1 | 1/2014 | Muscariello | |
| 2014/0029445 A1 | 1/2014 | Hui | |
| 2014/0032714 A1 | 1/2014 | Liu | |
| 2014/0033193 A1 | 1/2014 | Palaniappan | |
| 2014/0040505 A1 | 2/2014 | Barton | |
| 2014/0040628 A1 | 2/2014 | Fort | |
| 2014/0043987 A1 | 2/2014 | Watve | |
| 2014/0047513 A1 | 2/2014 | vantNoordende | |
| 2014/0074730 A1 | 3/2014 | Arensmeier | |
| 2014/0075567 A1 | 3/2014 | Raleigh | |
| 2014/0082135 A1 | 3/2014 | Jung | |
| 2014/0082661 A1 | 3/2014 | Krahnstoever | |
| 2014/0089454 A1 | 3/2014 | Jeon | |
| 2014/0096249 A1 | 4/2014 | Dupont | |
| 2014/0098685 A1 | 4/2014 | Shattil | |
| 2014/0108313 A1 | 4/2014 | Heidasch | |
| 2014/0108474 A1 | 4/2014 | David | |
| 2014/0115037 A1 | 4/2014 | Liu | |
| 2014/0122587 A1 | 5/2014 | Petker et al. | |
| 2014/0129736 A1 | 5/2014 | Yu | |
| 2014/0136814 A1 | 5/2014 | Stark | |
| 2014/0140348 A1 | 5/2014 | Perlman | |
| 2014/0143370 A1 | 5/2014 | Vilenski | |
| 2014/0146819 A1 | 5/2014 | Bae | |
| 2014/0149733 A1 | 5/2014 | Kim | |
| 2014/0237095 A1 | 5/2014 | Petker | |
| 2014/0156396 A1 | 6/2014 | deKozan | |
| 2014/0165207 A1 | 6/2014 | Engel | |
| 2014/0172783 A1 | 6/2014 | Suzuki | |
| 2014/0172981 A1 | 6/2014 | Kim | |
| 2014/0173034 A1 | 6/2014 | Liu | |
| 2014/0173076 A1 | 6/2014 | Ravindran | |
| 2014/0181140 A1 | 6/2014 | Kim | |
| 2014/0181186 A1* | 6/2014 | Stevens | H04L 67/322 709/203 |
| 2014/0181226 A1* | 6/2014 | Xu | H04L 51/14 709/206 |

(56) References Cited

U.S. PATENT DOCUMENTS

| | | |
|---|---|---|
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0201615 A1* | 7/2014 | Rajkumar ............... H04L 67/02 715/234 |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0258209 A1* | 9/2014 | Eshleman ............. G06F 16/283 707/602 |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1* | 9/2014 | Solis ..................... H04L 67/327 709/204 |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1* | 1/2015 | Franck ................... H04L 63/04 713/171 |
| 2015/0018770 A1 | 1/2015 | Baran |
| 2015/0032892 A1* | 1/2015 | Narayanan ............. H04L 47/70 709/226 |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0095762 A1* | 4/2015 | Rajkumar ............... H04L 67/02 715/234 |
| 2015/0113163 A1* | 4/2015 | Jacobson .............. H04L 45/745 709/238 |
| 2015/0113166 A1* | 4/2015 | Mosko ................... H04L 45/04 709/242 |
| 2015/0117253 A1* | 4/2015 | Scott ..................... H04L 45/306 370/254 |
| 2015/0117449 A1* | 4/2015 | Mosko .................. H04L 45/7453 370/392 |
| 2015/0117453 A1* | 4/2015 | Mosko .................. H04L 45/7457 370/392 |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0222603 A1* | 8/2015 | Uzun .................... H04L 63/0428 713/160 |
| 2015/0248455 A1* | 9/2015 | Sevilla ................ G06F 17/30312 707/736 |
| 2015/0256601 A1* | 9/2015 | Mosko ................. H04L 67/2842 709/213 |
| 2015/0261775 A1* | 9/2015 | Shin ..................... G06F 16/164 707/827 |
| 2015/0271267 A1* | 9/2015 | Solis ................... H04L 67/1097 709/213 |
| 2015/0279348 A1 | 10/2015 | Cao |
| 2015/0280918 A1* | 10/2015 | Uzun ..................... H04L 9/3236 713/176 |
| 2015/0280984 A1* | 10/2015 | Mahadevan ......... H04L 61/1582 709/222 |
| 2015/0281101 A1* | 10/2015 | Mosko ................. H04L 45/7453 370/235 |
| 2015/0281376 A1* | 10/2015 | Mahadevan ......... H04L 41/0809 709/223 |
| 2015/0286844 A1* | 10/2015 | Mosko ................... G06F 21/64 713/167 |
| 2015/0288755 A1* | 10/2015 | Mosko ................. H04L 67/1095 709/248 |
| 2015/0294025 A1* | 10/2015 | Wellen ................. G06F 16/9577 715/202 |
| 2015/0296028 A1* | 10/2015 | Scott ..................... H04L 67/16 709/217 |
| 2015/0312300 A1* | 10/2015 | Mosko .................. H04L 63/164 713/171 |
| 2015/0319241 A1* | 11/2015 | Scott ................... H04L 67/2842 709/214 |
| 2015/0349961 A1 | 12/2015 | Mosko |
| 2015/0350078 A1* | 12/2015 | Azgin ................... H04L 45/306 370/392 |
| 2015/0358436 A1* | 12/2015 | Kim ....................... H04L 63/10 370/392 |
| 2015/0372903 A1 | 12/2015 | Hui |
| 2015/0373162 A1* | 12/2015 | Mosko ................... H04L 69/22 370/392 |
| 2015/0381546 A1 | 12/2015 | Mahadevan |
| 2016/0006747 A1* | 1/2016 | Solis .................... H04L 63/123 726/26 |
| 2016/0019275 A1 | 1/2016 | Mosko |
| 2016/0020990 A1* | 1/2016 | Mahadevan ............ H04L 67/10 709/204 |
| 2016/0021170 A1* | 1/2016 | Mosko ................. G06F 17/3089 709/217 |
| 2016/0021172 A1 | 1/2016 | Mahadevan |
| 2016/0043960 A1* | 2/2016 | Solis ....................... H04L 67/10 709/223 |
| 2016/0062840 A1 | 3/2016 | Scott |
| 2016/0065677 A1* | 3/2016 | Mosko ................... H04L 29/12 709/228 |
| 2016/0072715 A1* | 3/2016 | Mahadevan ......... H04L 47/2466 370/236 |
| 2016/0105394 A1* | 4/2016 | Rangarajan ........... H04L 61/302 709/223 |
| 2016/0105524 A1* | 4/2016 | Farhadi ............... H04L 67/2842 370/412 |
| 2016/0110466 A1* | 4/2016 | Uzun ................. G06F 17/30876 707/751 |
| 2016/0119194 A1* | 4/2016 | Valencia Lopez ...... H04L 41/50 709/223 |
| 2016/0119234 A1* | 4/2016 | Valencia Lopez .... H04L 45/745 370/401 |
| 2016/0156714 A1* | 6/2016 | Farhadi ............... H04L 67/2842 709/217 |
| 2016/0164952 A1* | 6/2016 | Tur Nyi ................. H04L 67/10 709/219 |
| 2016/0171184 A1* | 6/2016 | Solis .................. H04L 67/1068 726/19 |
| 2016/0173410 A1* | 6/2016 | Lopez ................... H04L 47/805 370/230 |
| 2016/0191385 A1* | 6/2016 | Lopez ................... H04L 69/166 370/392 |
| 2016/0203170 A1* | 7/2016 | Mosko ................... G06F 16/289 707/741 |
| 2016/0205034 A1* | 7/2016 | Solis ..................... H04L 45/04 709/226 |
| 2016/0205178 A1* | 7/2016 | Mosko ................. H04L 67/104 709/204 |
| 2016/0212277 A1* | 7/2016 | Lopez ................... H04M 15/835 |
| 2016/0241669 A1* | 8/2016 | Royon ................. H04L 67/2847 |
| 2016/0277340 A1* | 9/2016 | Mosko ................. H04L 67/2833 |
| 2016/0285671 A1* | 9/2016 | Rangarajan ......... H04L 41/0233 |
| 2016/0352604 A1* | 12/2016 | Valencia Lopez ..................... H04L 67/2842 |
| 2016/0352614 A1* | 12/2016 | Valencia Lopez .... H04L 45/021 |
| 2016/0366620 A1* | 12/2016 | Royon ................... H04L 67/10 |
| 2016/0380945 A1* | 12/2016 | Wood ................... H04L 67/327 709/204 |
| 2016/0380970 A1* | 12/2016 | Jacobson .............. G06F 15/173 713/176 |

(56) References Cited

U.S. PATENT DOCUMENTS

| | | | |
|---|---|---|---|
| 2017/0012867 A1* | 1/2017 | Royon | H04L 45/42 |
| 2017/0091251 A1* | 3/2017 | Wood | G06F 17/30117 |
| 2017/0134276 A1* | 5/2017 | White | H04L 45/742 |
| 2017/0163760 A1* | 6/2017 | Wood | H04L 45/7453 |
| 2017/0201577 A1* | 7/2017 | Wood | H04L 67/1095 |
| 2017/0214661 A1* | 7/2017 | Wood | H04L 63/0428 |
| 2017/0249468 A1* | 8/2017 | Wood | G06F 21/602 |
| 2017/0257461 A1* | 9/2017 | Wood | H04L 67/327 |

FOREIGN PATENT DOCUMENTS

| | | | | |
|---|---|---|---|---|
| DE | 1720277 | A1 | 6/1967 | |
| DE | 19620817 | A1 | 11/1997 | |
| EP | 0295727 | A2 | 12/1988 | |
| EP | 0757065 | A2 | 7/1996 | |
| EP | 1077422 | A2 | 2/2001 | |
| EP | 1383265 | A1 | 1/2004 | |
| EP | 1384729 | A1 | 1/2004 | |
| EP | 1473889 | A2 | 11/2004 | |
| EP | 2120402 | | 11/2009 | |
| EP | 2120419 | | 11/2009 | |
| EP | 2120419 | A2 | 11/2009 | |
| EP | 2124415 | A2 | 11/2009 | |
| EP | 2214357 | A1 | 8/2010 | |
| EP | 2299754 | A1 | 3/2011 | |
| EP | 2323346 | | 5/2011 | |
| EP | 2552083 | | 1/2013 | |
| EP | 2214356 | | 5/2016 | |
| WO | 03005288 | A2 | 1/2003 | |
| WO | 03042254 | A1 | 5/2003 | |
| WO | 03049369 | A2 | 6/2003 | |
| WO | 03091297 | A1 | 11/2003 | |
| WO | 2005041527 | | 5/2005 | |
| WO | 2007113180 | A1 | 10/2007 | |
| WO | 2007122620 | | 11/2007 | |
| WO | 2007144388 | A1 | 12/2007 | |
| WO | 2011049890 | A1 | 4/2011 | |
| WO | 2012077073 | A1 | 6/2012 | |
| WO | WO 2012089004 | A1 * | 7/2012 | H04L 9/3247 |
| WO | WO 2013098468 | A1 * | 7/2013 | H04N 21/23439 |
| WO | 2013123410 | | 8/2013 | |
| WO | 2014023072 | | 2/2014 | |
| WO | 2015084327 | | 6/2015 | |

OTHER PUBLICATIONS

Lum et al "User-Centric Content Negotiation for Effective Adaptation Service in Mobile Computing," IEEE Transactions on Software Engineering, vol. 29, No. 12, Dec. 2003, pp. 1100-1111 (Year: 2003).*
Hess et al "Content-Triggered Trust Negotiation," ACM Transactions on Information and System Security, vol. 7, No. 3, Aug. 2004, pp. 428-456 (Year: 2004).*
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM Wkshps), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.

(56) References Cited

OTHER PUBLICATIONS

Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
I. Psaras, Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Science vol. 5443 (2009).
V. Jacobson et al., 'Networking Named Content,' Proc. IEEE CoNEXT '09, Dec. 2009.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
402Best Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.

(56) References Cited

OTHER PUBLICATIONS

McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

Rosenberg, J. "Interactive Connectivity Establishment (ICE): A Protocol for Network Address Translator (NAT) Traversal for Offer/Answer Protocols", Apr. 2010, pp. 1-117.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Sandvine, Global Internet Phenomena Report—Spring 2012. Located online at http://www.sandvine.com/downloads/ documents/ Phenomenal H 2012/Sandvine Global Internet Phenomena Report 1H 2012.pdf.

Scalable and Adaptive Internet Solutions (SAIL) Project [online], http://sail-project.eu/ Downloaded Mar. 9, 2015.

Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

Shani, Guy, Joelle Pineau, and Robert Kaplow. "A survey of point-based POMDP solvers." Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 23.4 (2007): 309-322.

Shih, Eugene et al., 'Wake on Wireless: An Event Driven Energy Saving Strategy for Battery Operated Devices', Sep. 23, 2002, pp. 160-171.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

Sun, Ying, and Daniel S. Weld. "A framework for model-based repair." AAAI. 1993.

T. Ballardie, P. Francis, and J. Crowcroft, "Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

The Despotify Project (2012). Available online at http://despotify.sourceforge.net/.

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

V. K. Adhikari, S. Jain, Y. Chen, and Z.-L. Zhang. Vivisecting Youtube:An Active Measurement Study. In INFOCOM12 Mini-conference (2012).

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

(56) References Cited

OTHER PUBLICATIONS

Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hogue et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/ pubs/hhg/1.2%20CCNx%201.0%20Tutorial.pdf [retrieved on Jun. 8, 2016] *paragraphs [003]-[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* *Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Ravio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.
Xie et al. "Collaborative Forwarding and Caching in Content Centric Networks", Networking 2012.
Extended European Search Report and Written Opinion in counterpart European Application No. 16180664.1, dated Nov. 14, 2016, 11 pages.

* cited by examiner

CONTENT NEGOTIATION IN A CONTENT CENTRIC NETWORK

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814"), and U.S. patent application Ser. No. 12/338,175 (now U.S. Pat. No. 9,456,054), entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338, 175");

the disclosures of which are herein incorporated by reference in their entirety.

BACKGROUND

Field

This disclosure is generally related to distribution of digital content. More specifically, this disclosure is related to a system and method for negotiating content in a content centric network (CCN) based on encoding acceptable responses in a CCN name.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. As an interest packet is routed through the network from a content requesting node to a content producing node, each intermediate CCN router adds an entry in its pending interest table (PIT) corresponding to the interest and forwards the interest to the next CCN router. When a matching content object packet is sent from the content producing node back to the requesting node, it follows the reverse path of the interest. Each intermediate CCN router forwards the content object along the requesting interfaces listed in the corresponding PIT entry and subsequently removes the PIT entry, indicating that the interest has been fulfilled.

The increasing amount of digital content also creates a need for flexible access to content, such as allowing a content requesting node or a client to specify a response with qualifiers. Content negotiation in hypertext transfer protocol (HTTP) is one technique that permits this flexible access. The HTTP protocol allows a client to transmit a "GET" request to an HTTP server and include additional meta-data in the request to obtain a specific set of resources, such as a document in a certain language or encoding. As CCN architectures evolve, there is a need to provide a similar, content negotiation technique to content requesting nodes or clients.

SUMMARY

One embodiment provides a system that facilitates content negotiation in a content centric network. During operation, the system receives, by a content producing device, a packet that corresponds to a first interest, wherein an encoded name for the interest indicates a plurality of qualifiers for acceptable types of requested content, and wherein a name is a hierarchically structured variable length identifier which comprises contiguous name components. The system generates a first content object that satisfies one of the indicated plurality of qualifiers, wherein a name for the content object is the encoded name, and wherein a content object indicates data and a content type corresponding to the satisfied qualifier.

In some embodiments, the system generates a second content object that indicates a multipart content object, wherein a name for the multipart content object is the encoded name, wherein the multipart content object indicates a plurality of member content objects, and wherein a member content object indicates a content-specific name. Responsive to determining that the content producing device can satisfy another qualifier, the system generates a corresponding content object that satisfies the other qualifier. The system also adds the corresponding content object to the multipart content object as a member content object.

In some embodiments, the system encrypts data associated with the corresponding content object based on authentication information, and prepends the authentication information to the corresponding content object.

In some embodiments, the system encrypts data associated with the corresponding content object based on authentication information, and replaces the encrypted data with the authentication information.

In some embodiments, the first content object further indicates a second content object that indicates authentication information for the first content object.

In some embodiments, the first content object further indicates a content-specific name.

In some embodiments, the system generates an unrequested content object based on the first interest and application logic of the content producing device. The system then transmits the generated unrequested content object to a requesting device associated with the first interest.

In some embodiments, the system generates a third content object that indicates information and a content-specific name to be used in a new interest for content based on an indicated qualifier, wherein a name for the third content object is the encoded name. The system receives a packet that corresponds to a second interest, wherein a name for the second interest is the content-specific name indicated in the third content object. The system also generates a fourth content object that satisfies the second interest, wherein a name for the fourth content object is the content-specific name for the second interest.

In another embodiment of the present invention, the system receives, by a forwarding device, a packet that corresponds to a first interest, wherein an encoded name for the interest indicates a plurality of qualifiers for acceptable types of requested content, and wherein a name is a hierarchically structured variable length identifier which comprises contiguous name components. The system adds an entry in a pending interest table for the first interest based on the encoded name. Subsequently, the system receives a packet that corresponds to a first content object that satisfies one of the indicated plurality of qualifiers, wherein a name for the first content object is the encoded name, and wherein a content object indicates data and a content type corresponding to the satisfied qualifier.

In a variation on this embodiment, the system generates a second interest based on the first content object and application logic of the forwarding device. The system adds an entry in a pending interest table for the second interest, and transmits the second interest to a content producing device.

In some embodiments, the system receives a packet that corresponds to a second content object that matches the second interest. The system stores the second content object in a cache.

In some embodiments, responsive to determining that the first content object indicates a multipart content object, the system partitions the multipart content object into one or more member content objects, wherein a member content object includes a content-specific name. The system stores the multipart content object in a cache based on the encoded name. The system also stores the one or more member content objects in the cache based on the corresponding content-specific name.

In some embodiments, the system identifies the entry in the pending interest table for the encoded name and a corresponding interface associated with the first interest. The system transmits the multipart content object via the identified interface. The system also removes the identified entry from the pending interest table.

BRIEF DESCRIPTION OF THE FIGURES

In the figures, like reference numerals refer to the same figure elements.

DETAILED DESCRIPTION

Figure 1A:
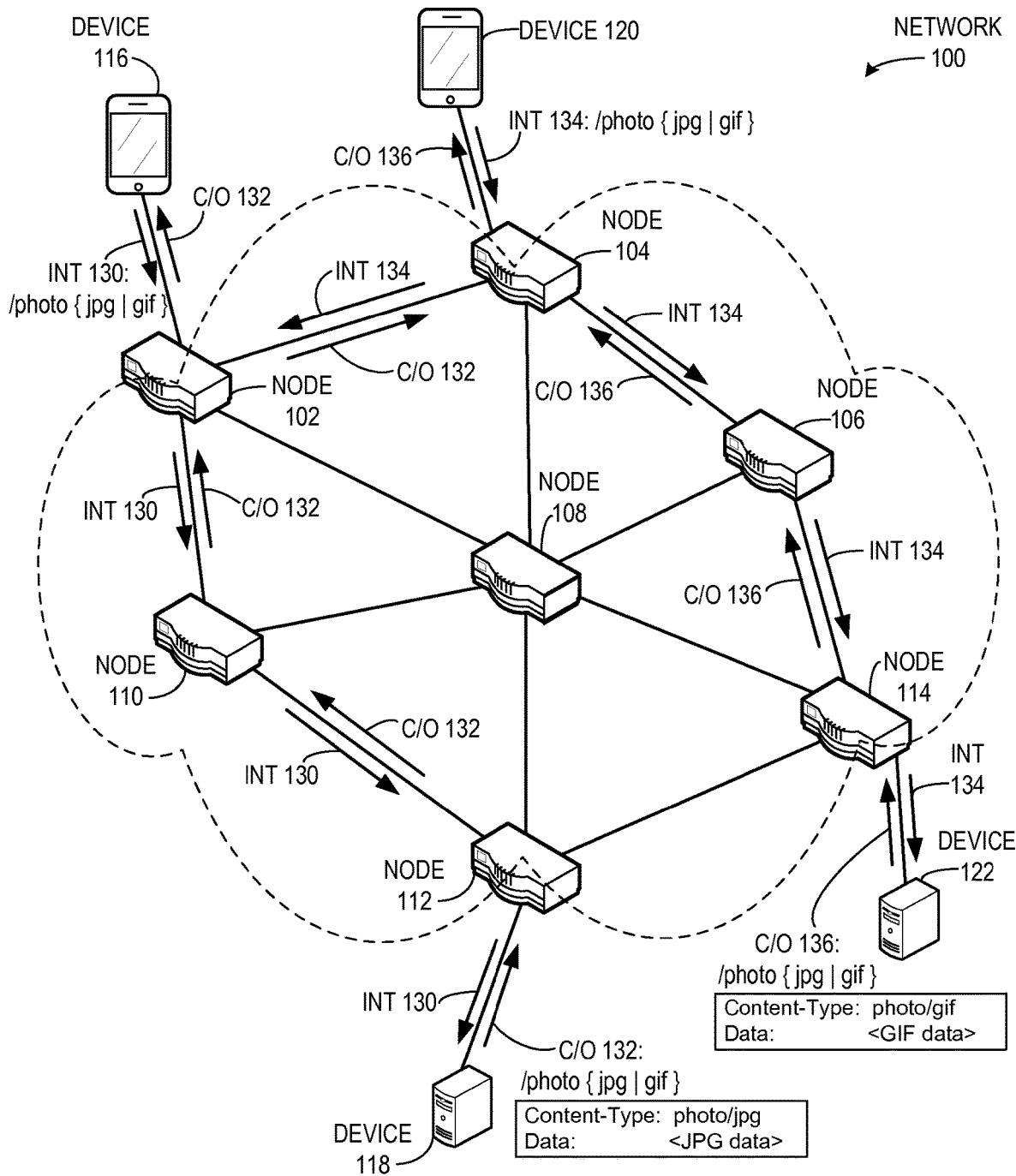
FIG. 1A illustrates an exemplary network that facilitates content negotiation in a CCN, based on a method of abstraction, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates content negotiation in a content centric network (CCN). In a traditional content negotiation method, such as based on HTTP, a client can transmit a "GET" request which can include metadata or qualifiers for requested content, e.g., a specific language or encoding type. In CCN, all content (including an interest or a request for content) can be identified by a name, such as "photo.jpg." However, a CCN name typically does not contain any information regarding the content, the encoding, or even whether the data is, e.g., a photo. A client that requests a JPG, but can accept a GIF, therefore has no way of including this qualifying information in a standard CCN interest. In addition, a producer can generate a JPG, which can be cached by an intermediate router. The producer can subsequently move to a GIF format, which may result in a client's interest for a JPG passing through intermediate nodes which do not have a cached version of the JPG. Thus, the producer's format change may leave the client without a reliable means to retrieve the previously generated JPG from the producer.

The system of the present invention addresses these content negotiation issues by encoding qualifiers into a CCN name, such as: "/name_component{types}," where "/name_component" can be the beginning of the requested document name, and "types" can be a list of qualifiers for acceptable encodings of requested content. For example, a CCN interest with a name of "/photo{jpg|gif}" is a request for a document entitled "/photo" with data that must be encoded in either JPG or GIF format. Note that there is no limit on the number of qualifiers that can be included an encoded name.

A content producer that receives the interest can send back content based on three methods. In the first method, content negotiation by abstraction, the producer can send back a response that satisfies at least one of the qualifiers, e.g., either JPG or GIF. Because the request was for either JPG or GIF, either format will satisfy the response. The name of the responsive content object is the encoded name, "/photo{jpg|gif}" with data corresponding to the specifically encoded content object. A first producer can respond with a JPG encoded content object, and a second producer can respond with a GIF encoded content object. This can result in intermediate forwarders or routers caching two content objects with the same encoded name and different data. Either of these content objects can satisfy a subsequent request for "/photo{jpg|gif}."

In the second method, content negotiation by oversupply, the producer can include as many content objects as it can, e.g., both JPG and GIF. The producer can create a multipart content object with the encoded name, and include both the JPG and the GIF encoded data as member content objects in the multipart content object. The client is then responsible for parsing or partitioning the received multipart content object into its member content objects.

In the third method, content negotiation by redirection, the producer can return a content object that includes a list of non-encoded names and metadata to use in a new request for content. The can review the list, determine which name to use for a specific encoding or content type, and transmit a new interest with a specific name (e.g., a non-encoded name).

In addition, both a producer and a forwarder can perform optimization operations. For example, based on a producer's application logic, the producer can "pre-seed" the network by pushing additional or related content in response to receiving an interest with the encoded name. Similarly, based on a forwarder's application logic, the forwarder can "pre-fetch" content for the network by issuing new interests for content in response to receiving interests or content with an encoded name. The forwarder can also parse or partition a multipart content object so that each member content object can be cached and made available for future requests.

In CCN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms are used to describe the CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175.

Exemplary Network and Communication

FIG. 1A illustrates an exemplary network 100 that facilitates content negotiation in a CCN, based on a method of abstraction, in accordance with an embodiment of the present invention. Network 100 can include content requesting devices 116 and 120, content producing devices 118 and 122, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106-110).

During operation, a first client (e.g., device 116) can generate an interest 130 with an encoded name of "/photo{jpg|gif}" and send interest 130 to node 102. Node 102 can add an entry for interest 130 in its pending interest table (PIT), and send interest 130 to nodes 110 and 112, each of which perform similar operations. Node 112 can send interest 130 to a first content producer (e.g., device 118). Producer 118 can determine a content negotiation method of abstraction and satisfy interest 130 by sending back a content object 132 with the encoded name, a content-type of "photo/jpg," and corresponding JPG encoded data. Content object 132 travels the reverse path as interest 130 (e.g., via nodes 112, 110, and 102 back to client 116), with each intermediate node caching content object 132 with the encoded name and the JPG encoded data.

Multiple copies of the content with the same encoded name but different data (e.g., encoding or data types) can exist on the network. For example, a second client (e.g., device 120) can generate an interest 134 with the same name as interest 130 (e.g., "/photo{jpg|gif}"), and send interest 134 to node 104. Node 104 adds an entry for interest 134 in its PIT, and sends interest 134 to node 102. Node 102, having a cached copy of the requested content with the encoded name and JPG encoded data, can satisfy interest 134 and return responsive content object 132 back to client 120 via node 104. Alternatively, upon receiving interest 134, node 104 can send interest 134 along a different path to node 106. Node 106 can cache interest 134 in its PIT, and send interest 134 on to node 114, which again caches interest 134 in its PIT and sends interest 134 to a second content producer (e.g., device 122). Producer 122 can determine a content negotiation method of abstraction and satisfy interest 134 by sending back a content object 136 with the encoded name, a content-type of "photo/gif," and GIF encoded data. Content object 136 travels the reverse path as interest 134 (e.g., via nodes 114, 106, and 104 back to client 120), with each intermediate node caching content object 136 with the encoded name and the GIF encoded data. In this way, multiple copies of content with the same encoded name but different data can exist on network 100.

Figure 1B:
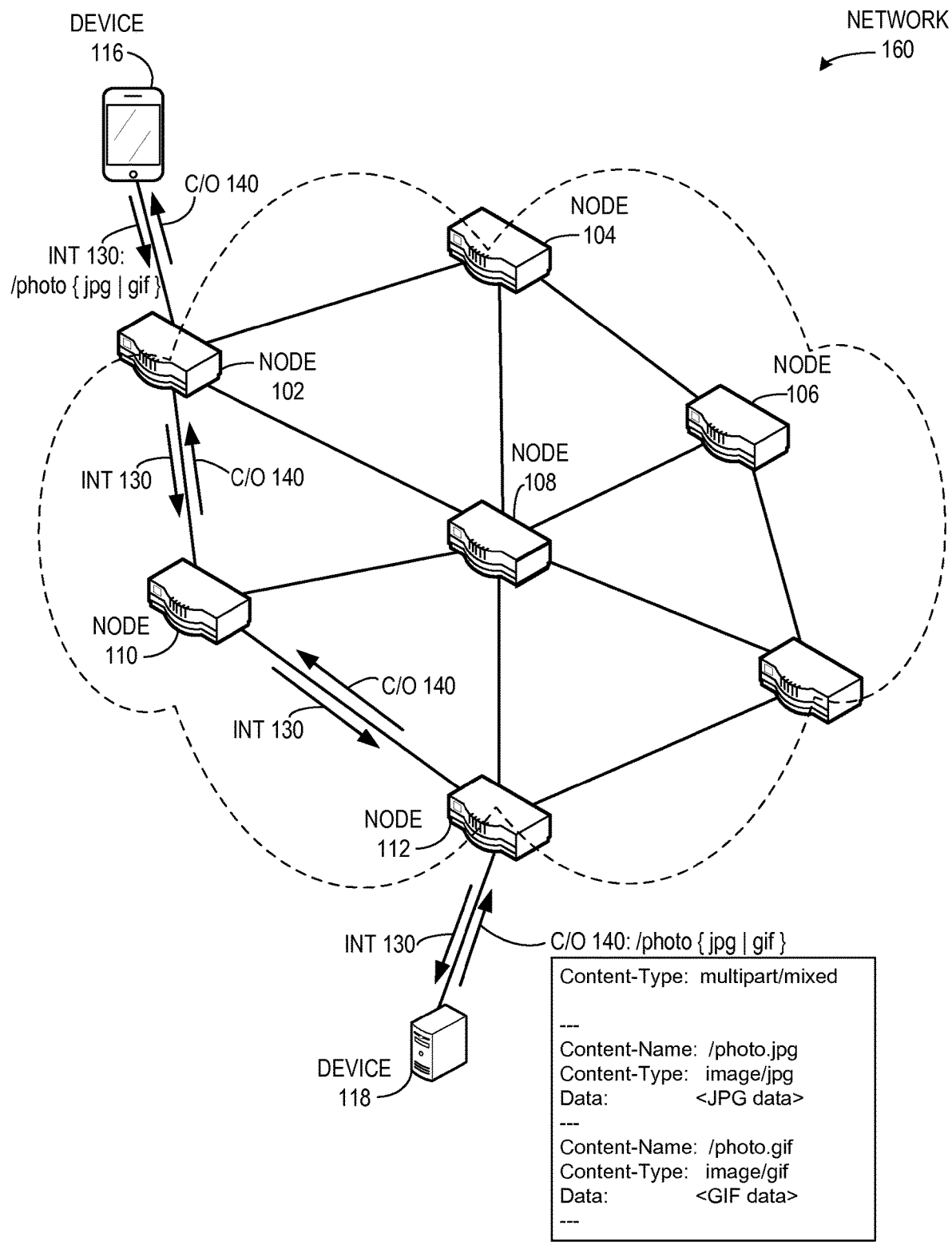
FIG. 1B illustrates an exemplary network that facilitates content negotiation in a CCN, based on a method of oversupply, in accordance with an embodiment of the present invention.

FIG. 1B illustrates an exemplary network 160 that facilitates content negotiation in a CCN, based on a method of oversupply, in accordance with an embodiment of the present invention. During operation, similar to the data flow shown in FIG. 1A, a first client (e.g., device 116) generates an interest 130 with an encoded name of "/photo{jpg|gif}" and sends interest 130 to producer 118 via nodes 102, 110, and 112, each of which can add an entry for interest 130 in its PIT. Node 112 can send interest 130 to producer 118, which can determine a content negotiation method of oversupply. Producer 118 can satisfy interest 130 by sending back a multipart content object 140 with the encoded name, a content-type of "multipart/mixed," and corresponding member content objects encoded with JPG and GIF data. Each member content object can include a content-name (e.g., "/photo.jpg"), a content-type (e.g., "image/jpg"), and corresponding data (e.g., "<JPG data>"). Multipart content object 140 travels the reverse path as interest 130 (e.g., via nodes 112, 110, and 102 back to client 116), with each intermediate node caching multipart content object 140 with the encoded name and the member content objects with different encodings. Upon receiving multipart content object 140, an intermediate CCN router or forwarder (e.g., node 110) can parse or partition multipart content object 140 into its member content objects and store the member content objects in its cache to satisfy future requests. Similarly, client 116 can receive and partition multipart content object 140 into its member content objects, each of which satisfies the original interest request for GIF or JPG data (e.g., interest 130).

Figure 1C:
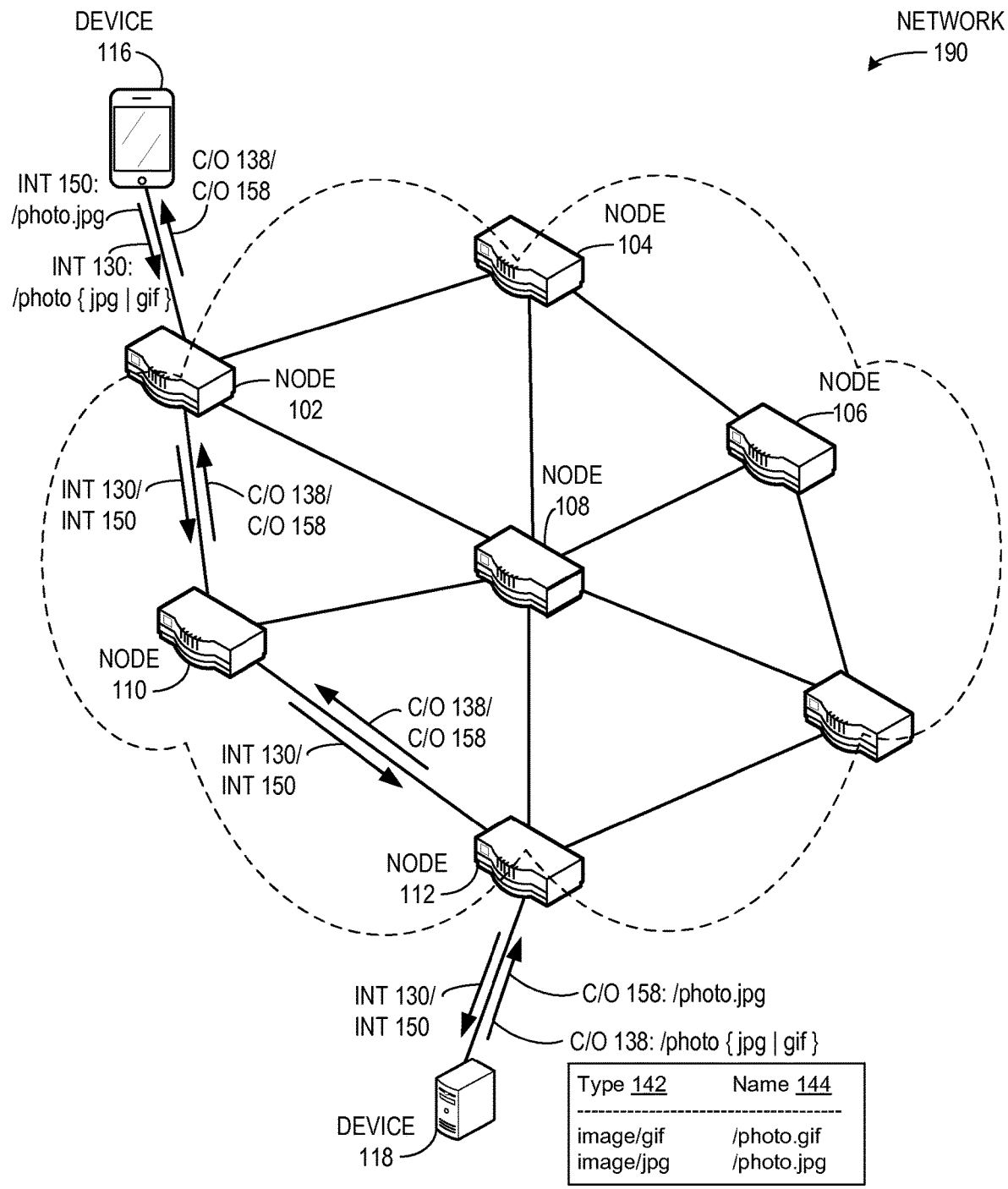
FIG. 1C illustrates an exemplary network that facilitates content negotiation in a CCN, based on a method of redirection, in accordance with an embodiment of the present invention.

FIG. 1C illustrates an exemplary network 190 that facilitates content negotiation in a CCN, based on a method of redirection, in accordance with an embodiment of the present invention. During operation, similar to the data flow shown in FIG. 1A, client 116 generates an interest 130 with a name of "/photo{jpg|gif}" and sends interest 130 to producer 118 via nodes 102, 110, and 112. Producer 118 can determine a content negotiation method of redirection and satisfy interest 130 by sending back a content object 138 with the encoded name. Content object 138 can indicate a list of specific content names and corresponding metadata to be used to generate a new interest. For example, content object 138 can include a content type field 142 and a content name field 144. One entry in content object 138 can include a value of "image/gif" for the type field 142 and a value of "/photo.gif" for the name field 144. Content object 138 travels the reverse path as interest 130 (e.g., via nodes 112, 110, and 102 back to client 116), with each intermediate node caching content object 138 with the encoded name and list of type and name information. Upon receiving content object 138, client 116 can generate and transmit a new interest based on the desired content type. For example, client 116 can generate an interest 150 with a name of "/photo.jpg," and send interest 150 to producer 118 through the network via nodes 102, 110, and 112. Producer 118 can satisfy interest 150 with a content object 158, which has a name of "/photo.jpg" (e.g., a traditional, non-encoded CCN name) and return content object 158 back to client 116 via the reverse path. Alternatively, any intermediate node or forwarder that receives interest 150 and contains content matching the name "/photo.jpg" in its cache can satisfy interest 150.

Role of Content Producing Device

Figure 2A:
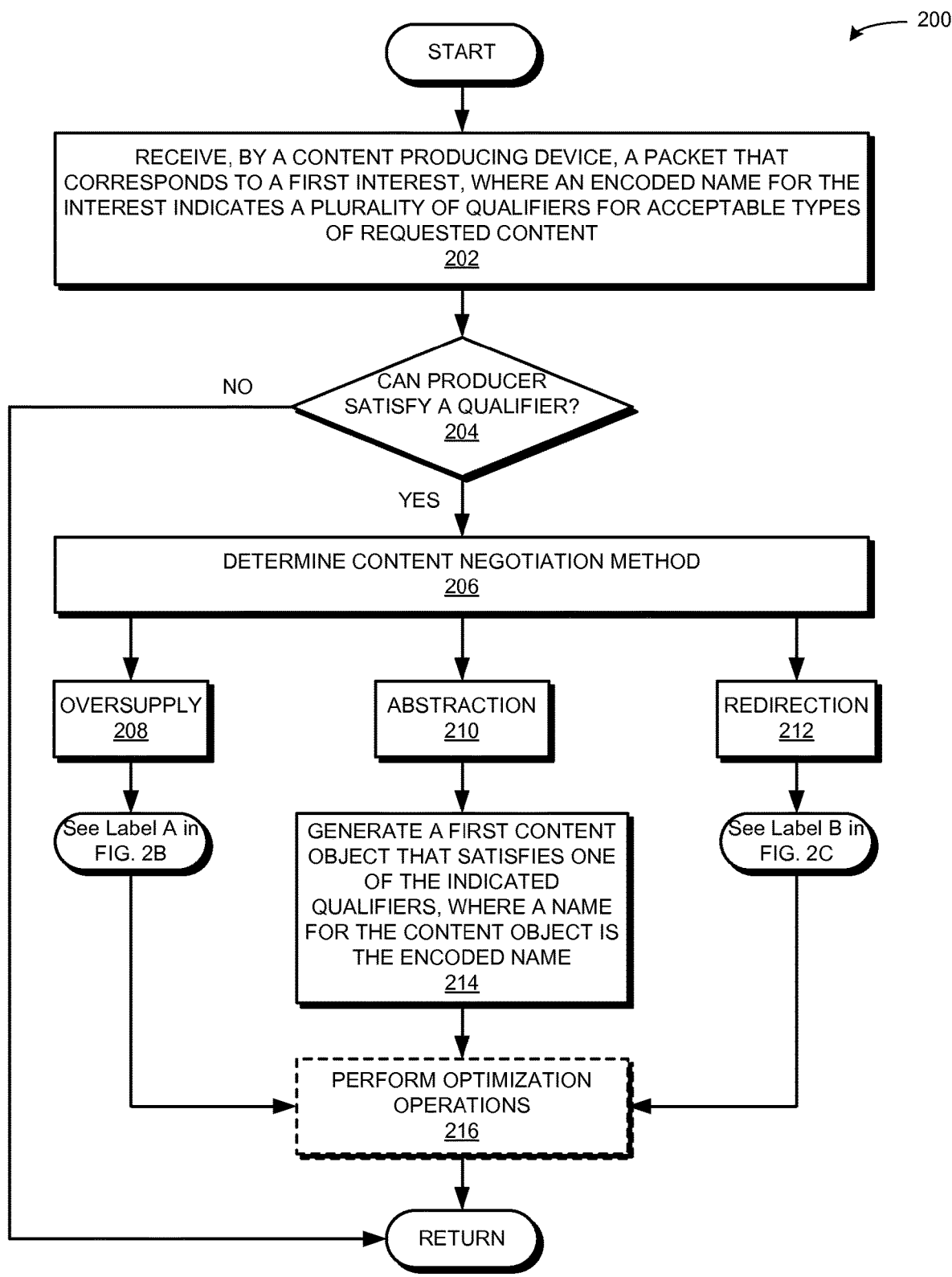
FIG. 2A presents a flow chart illustrating a method by a content producing device for facilitating content negotiation in a CCN, in accordance with an embodiment of the present invention.

FIG. 2A presents a flow chart 200 illustrating a method by a content producing device for facilitating content negotiation in a CCN, in accordance with an embodiment of the present invention. During operation, a content producing device (e.g., a content producer) receives a packet that corresponds to a first interest, where an encoded name for the interest includes a plurality of qualifiers for acceptable types of requested content (operation 202). The producer determines whether it has content that can satisfy at least one of the qualifiers (decision 204). If it does not, the operation returns. If it does, the producer determines a content negotiation method (operation 206). The producer can choose a content negotiation method of oversupply (operation 208), abstraction (operation 210), or redirection (operation 212). For oversupply, the operation continues as described at Label A in FIG. 2B. For redirection, the operation continues as described at Label B in FIG. 2C. For abstraction, the producer generates a first content object that satisfies one of the indicated qualifiers, where a name for the content object is the encoded name (operation 214). The first content object can indicate data and a content type corresponding to the satisfied qualifier. The producer can transmit the first content object back to a requesting client based on information maintained in its PIT.

Subsequently, upon performing operations related to all three content negotiation methods, the producer can optionally perform optimization operations (operation 216). For example, the producer can generate an unrequested content object based on the first content object and application logic of the producer. The producer can then transmit the unrequested content object to a device associated with the first interest. This intelligent "pre-seeding" operation allows the producer to predict, based on a received interest, subsequent requests for content, and push the predicted content to the client (and simultaneously create cached copies of the content at intermediate routers in the network).

Figure 2B:
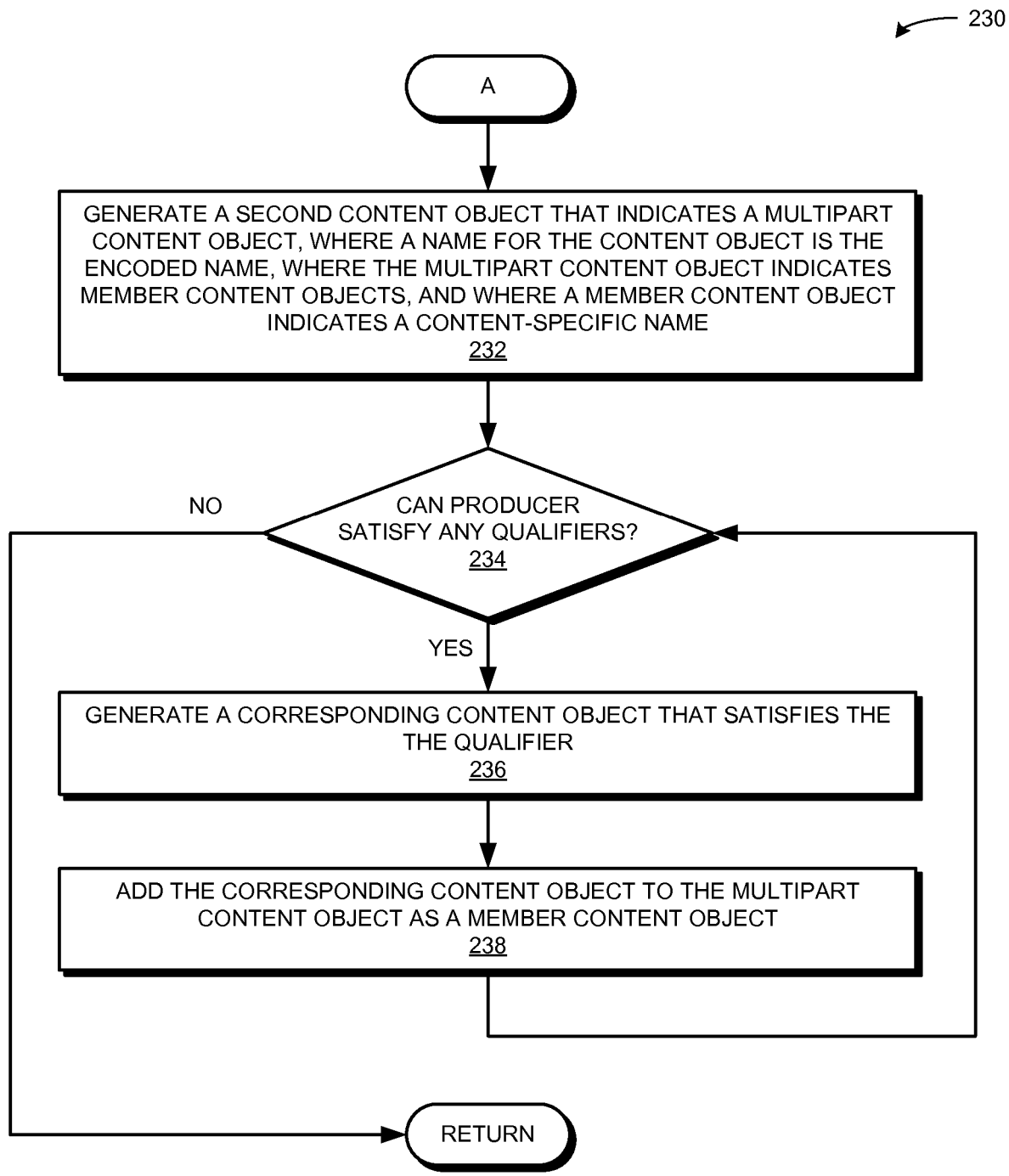
FIG. 2B presents a flow chart illustrating a method by a content producing device for facilitating content negotiation in a CCN, based on a method of oversupply, in accordance with an embodiment of the present invention.

FIG. 2B presents a flow chart 230 illustrating a method by a content producing device for facilitating content negotiation in a CCN, based on a method of oversupply, in accordance with an embodiment of the present invention. During operation, upon receiving an interest with an encoded name, a producer generates a second content object that indicates a multipart content object, where a name for the multipart content object is the encoded name (operation 232). The multipart content object indicates member content objects, and a member content object indicates a content-specific name. The producer determines whether it can satisfy any of the qualifiers listed in the encoded name (decision 234). If it cannot, the operation returns. If it can, the producer generates a corresponding content object that satisfies the qualifier (operation 236). The producer then adds the corresponding content object to the multipart content object as a member content object (operation 238). The operation returns to decision 234, where the producer continues to determine whether it can satisfy any other qualifiers, generating and adding member content objects until it can no longer satisfy any qualifiers, and the operation returns.

Figure 2C:
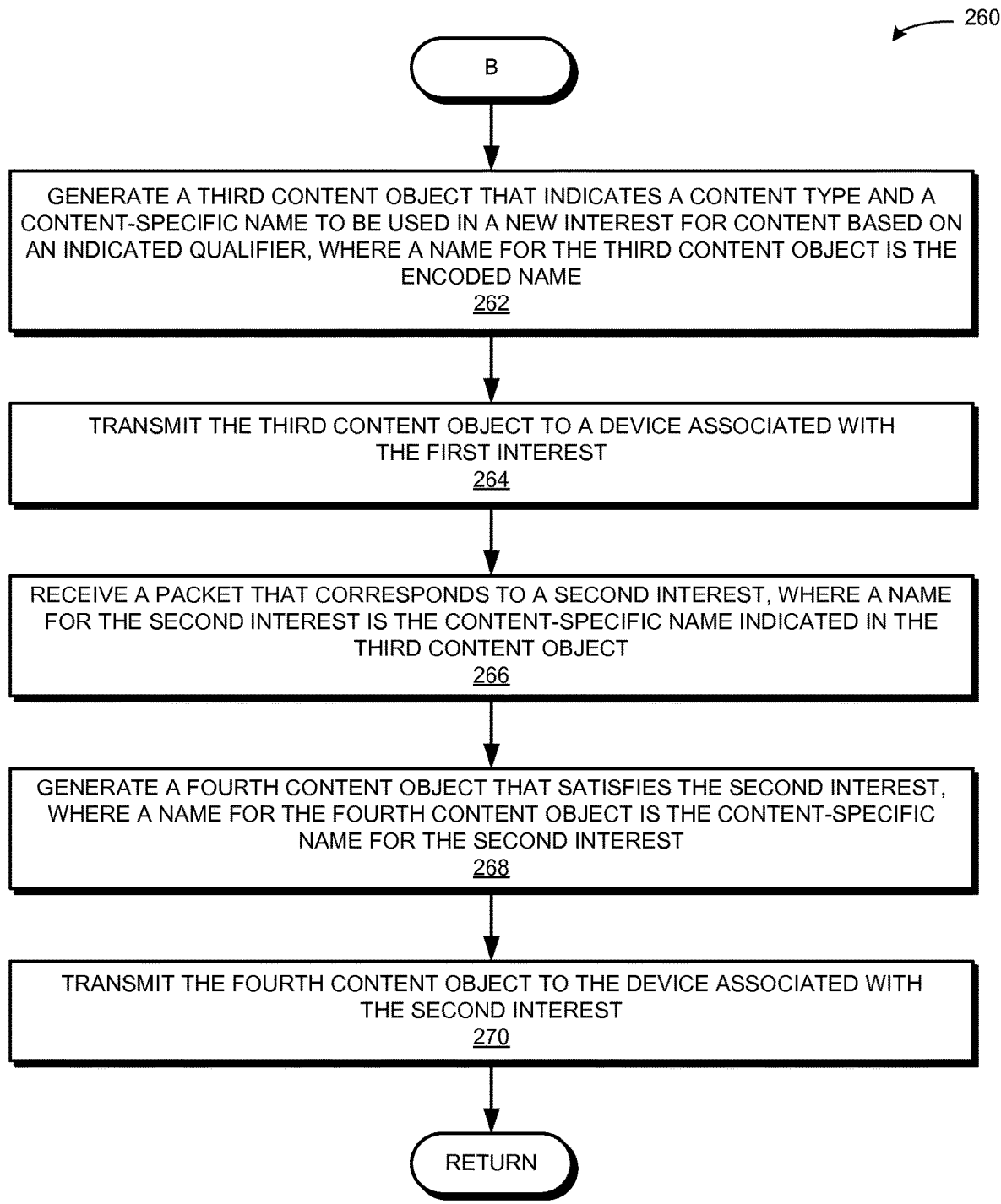
FIG. 2C presents a flow chart illustrating a method by a content producing device for facilitating content negotiation in a CCN, based on a method of redirection, in accordance with an embodiment of the present invention.

FIG. 2C presents a flow chart 260 illustrating a method by a content producing device for facilitating content negotiation in a CCN, based on a method of redirection, in accordance with an embodiment of the present invention. During operation, upon receiving an interest with an encoded name, a producer generates a third content object that indicates a content type and a content-specific name to be used in a new interest for content based on an indicated qualifier, where a name for the third content object is the encoded name (operation 262). The producer transmits the third content object to a device associated with the first interest (e.g., a client) (operation 264). Subsequently, the producer receives a packet that corresponds to a second interest, where a name for the second interest is the content-specific name indicated in the third content object (operation 266). The producer generates a fourth content object that satisfies the second interest, where a name for the fourth content object is the content-specific name for the second interest (operation 268). Finally, the producer transmits the fourth content object to the device associated with the second interest (e.g., the client) (operation 270).

Role of Forwarding Device or Intermediate Router

Figure 3:
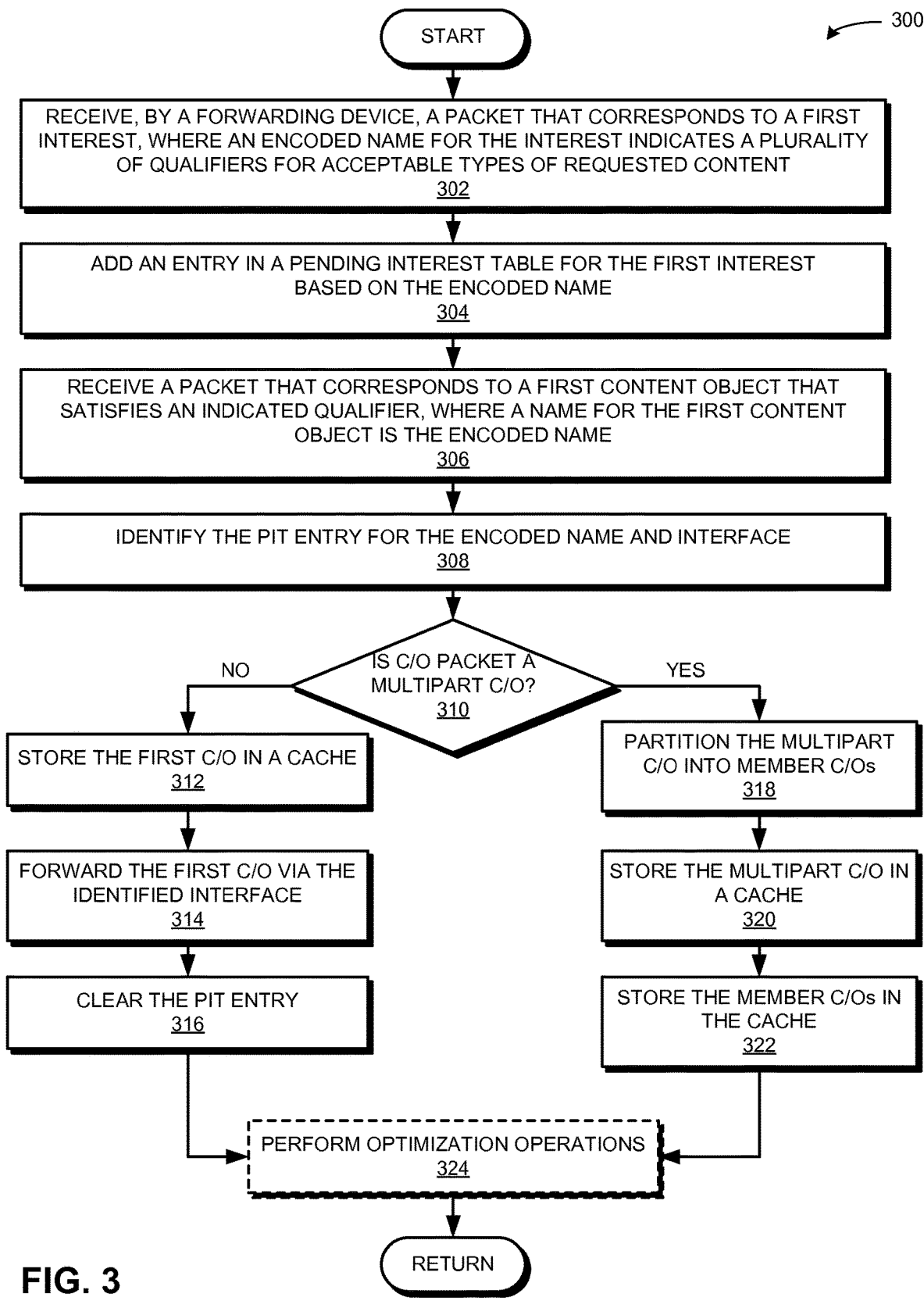
FIG. 3 presents a flow chart illustrating a method by a forwarding device for facilitating content negotiation in a CCN, in accordance with an embodiment of the present invention.

FIG. 3 presents a flow chart 300 illustrating a method by a forwarding device for facilitating content negotiation in a CCN, in accordance with an embodiment of the present invention. During operation, a forwarding device (e.g., a forwarder, router, intermediate router, intermediate node, or CCN router) receives a packet that corresponds to a first interest, where an encoded name for the interest indicates a plurality of qualifiers for acceptable types of requested content (operation 302). The forwarder adds an entry in its PIT for the first interest based on the encoded name (operation 304). Subsequently, the forwarder receives a packet that corresponds to a first content object that satisfies an indicated qualifier, where a name for the first content object is the encoded name (operation 306). The forwarder identifies the PIT entry for the encoded name and a corresponding interface on which the interest was received (operation 308). The forwarder determines whether the content object packet is a multipart content object (decision 310). If it is not, the forwarder stores the first content object in a cache (operation 312), forwards the first content object via the interface identified from the PIT (operation 314), and clears the PIT entry (operation 316). If the packet is a multipart content object, the forwarder partitions the multipart content object into member content objects (operation 318). The forwarder then stores the multipart content object in a cache (operation 320) and also stores each member content object in the cache (operation 322).

Next, the forwarder can optionally perform optimization operations (operation 324). The forwarder can intelligently "pre-fetch" content based on the first interest or the first content object and application logic of the forwarder. For example, the forwarder can generate one or more interests based on the received first content object. The forwarder can receive and cache one or more content objects corresponding to the generated interests. The forwarder can also transmit the received content objects to a device associated with the first interest (e.g., a client). This pre-fetching operation results in pre-seeding of unrequested and predicted content, which pushes the predicted content to the client and the network, as described above in relation to FIG. 2A.

Security and Access Control

Figure 4:
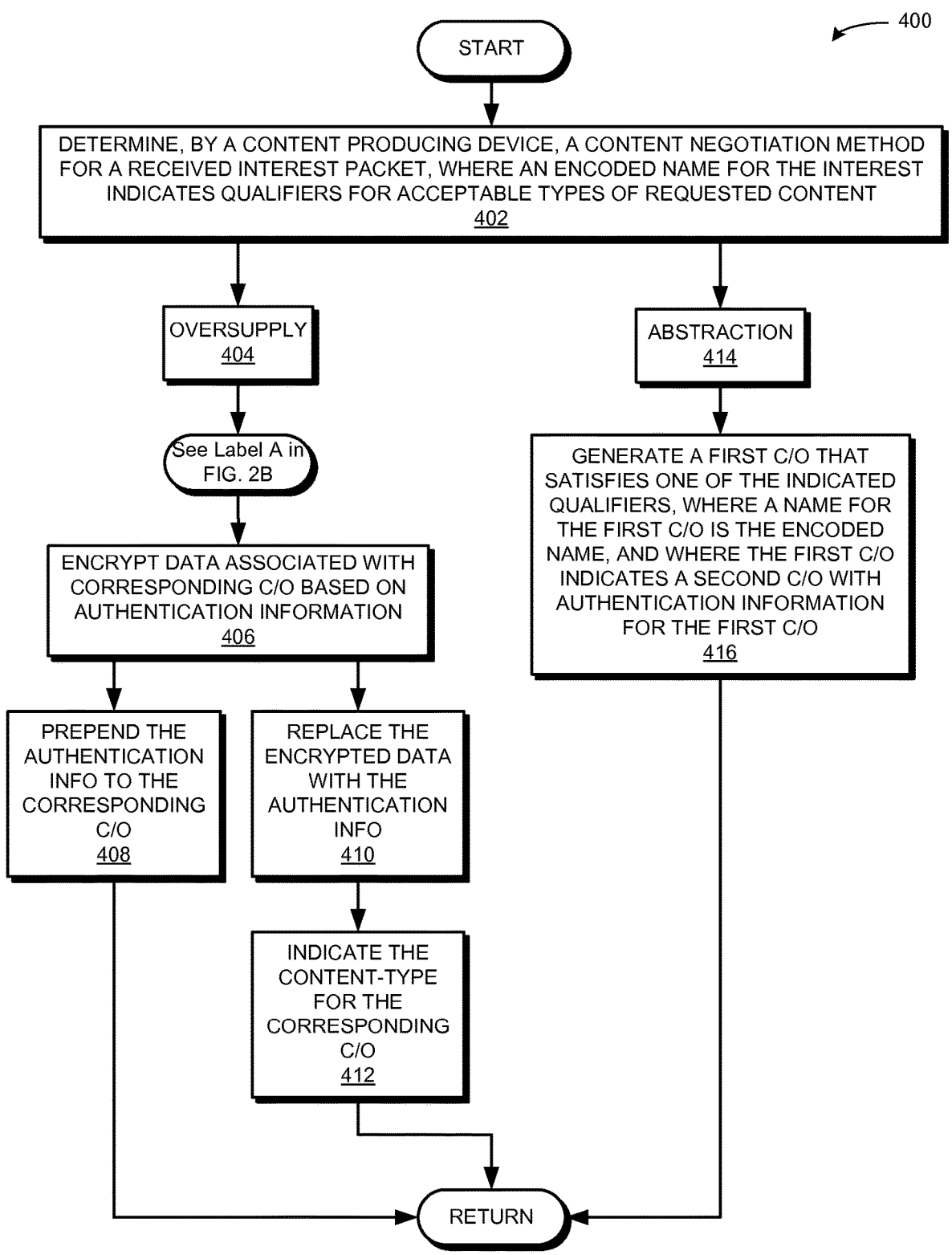
FIG. 4 presents a flow chart illustrating a method by a content producing device for providing access control during content negotiation in a CCN, in accordance with an embodiment of the present invention.

A client can request different types of content by including qualifiers in an encoded name. However, the different types of content may reside under different security or access control policies. For example, a client can request content in either HD or SD from a video-encoding service, but only a paying subscriber can retrieve the HD encoded video content. To address these needs, access control semantics can be integrated into the content negotiation protocol based on the specific content negotiation method. FIG. 4 presents a flow chart 400 illustrating a method by a content producing device for providing access control during content negotiation in a CCN, in accordance with an embodiment of the present invention. During operation, a content producing device (e.g., a content producer) determines a content negotiation method for a received interest packet, where an encoded name for the interest indicates qualifiers for acceptable types of requested content (operation 402). When the producer chooses the oversupply method (operation 404), the operation continues as described at Label A in FIG. 2B, which returns a multipart content object. Subsequently, the producer can encrypt the data associated with a corresponding content object (e.g., a member content object) based on authentication information. The authentication information can include encryption based on a shared symmetric key previously exchanged with the client, a digital certificate of the client and/or the producer, or a KeyId of the client and/or the producer. The producer can provide the authentication information in one of two ways: 1) by prepending the authentication information to the corresponding content object (operation 408); or 2) by replacing the encrypted data with the authentication information (operation 410), and indicating the content-type for the corresponding content object (operation 412). In some embodiments, e.g., when the size of the encrypted data is large, the producer may choose the second option, which requires the consumer to subsequently ask for the protected content directly (e.g., without negotiation, using a non-encoded, content-specific name). This results in the protected content being cached normally in the network. In addition, when providing the authentication information based on the second option, the producer can include in the multipart content object (e.g., the oversupply response) the content-type for each possible set of content object bytes, as either access control information or plaintext content object data, thus allowing a receiving client (or forwarder) to parse the multipart content object correctly.

When the producer chooses the abstraction method (operation 414), the producer generates a first content object that satisfies one of the indicated qualifiers, where a name for the first content object is the encoded name (operation 416). The first content object can indicate data and a content type corresponding to the satisfied qualifier. The first content object can also indicate a second content object, which indicates authentication information for the first content object. Because the producer decides which data format to use in a responding content object, and because access control policies may differ based on the selected data format, the producer can again tie access control to each of its possible responses. For example, if the producer returns a GIF image in response to an interest for a JPG or a GIF, the access control information for the GIF (e.g., a name to an access control specification content object) can be included in the content object response.

When the producer chooses the redirection method (not shown in FIG. 4), the responsive content object contains the names (e.g., pointers) for possible content types that can be satisfied by the producer. Because a subsequent interest transmitted by the client is for a specific content object, the producer can use standard CCN-compliant access control policies to restrict access to the corresponding content object.

Exemplary Apparatuses

Figure 5A:
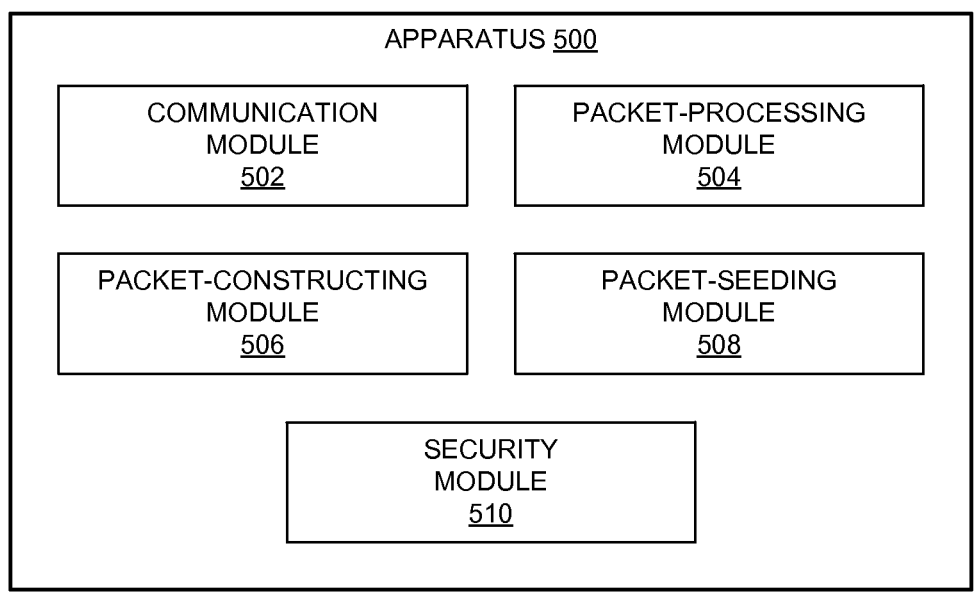
FIG. 5A illustrates an exemplary apparatus that facilitates content negotiation in a CCN, in accordance with an embodiment of the present invention.

FIG. 5A illustrates an exemplary apparatus 500 that facilitates content negotiation in a CCN, in accordance with an embodiment of the present invention. Apparatus 500 can comprise a plurality of modules which may communicate with one another via a wired or wireless communication channel. Apparatus 500 may be realized using one or more integrated circuits, and may include fewer or more modules than those shown in FIG. 5. Further, apparatus 500 may be integrated in a computer system, or realized as a separate device which is capable of communicating with other computer systems and/or devices. Specifically, apparatus 500 can comprise a communication module 502, a packet-processing module 504, a packet-constructing module 506, a packet-seeding module 508, and a security module 510.

In some embodiments, communication module 502 can send and/or receive data packets (including interests and content objects) to/from other network nodes across a computer network. Packet-constructing module 506 can generate a first content object that satisfies a qualifier indicated in an encoded name for an interest. Packet-constructing module 506 can also generate a second content object that indicates a multipart content object with a name that is the encoded name, and where the multipart content object indicates member content objects. Packet-processing module 504 can determine that a device can satisfy an indicated qualifier. Packet-constructing module 506 can generate a content object that satisfies the indicated qualifier, and further add the content object to the multipart content object. Packet-constructing module 506 can generate a third content object that indicates information and a content-specific name to be used in a new interest for content based on an indicated qualifier. Packet-constructing module 506 can also generate a fourth content object that satisfies a second interest with a name that is the content-specific name indicated in the third content object.

Packet-seeding module 508 can generate an unrequested content object based on a first interest and application logic of a content producing device, and further transmit the unrequested content object to a device associated with the first interest. Security module 510 can encrypt data associated with a content object based on authentication information, and prepend the authentication information to the corresponding content object. Security module 510 can also replace the encrypted data with the authentication information.

Figure 5B:
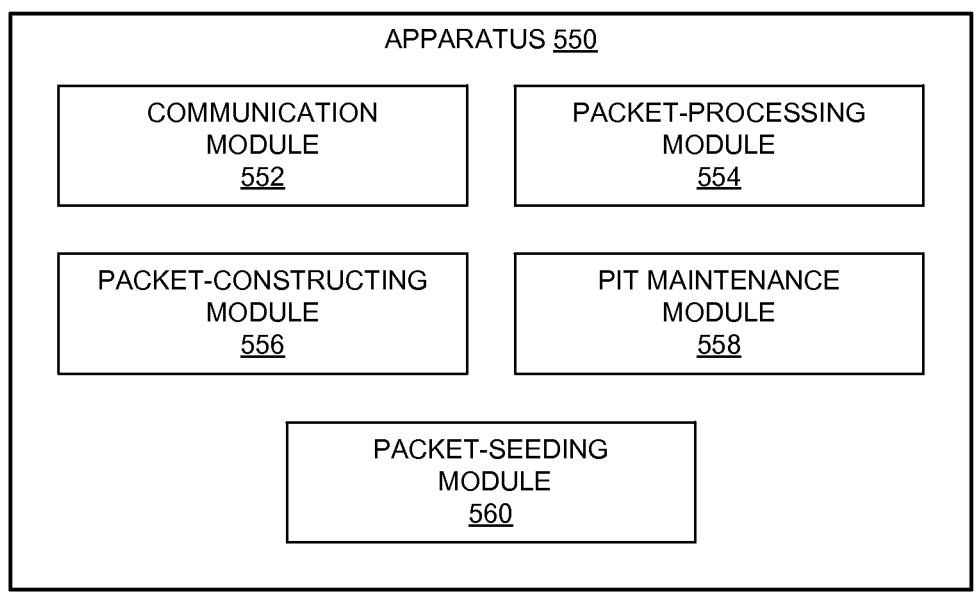
FIG. 5B illustrates an exemplary apparatus that facilitates content negotiation in a CCN, in accordance with an embodiment of the present invention.

FIG. 5B illustrates an exemplary apparatus 550 that facilitates content negotiation in a CCN, in accordance with an embodiment of the present invention. Apparatus 550 can comprise a plurality of modules which may communicate with one another via a wired or wireless communication channel. Apparatus 550 may be realized using one or more integrated circuits, and may include fewer or more modules than those shown in FIG. 5B. Further, apparatus 550 may be integrated in a computer system, or realized as a separate device which is capable of communicating with other computer systems and/or devices. Specifically, apparatus 550 can comprise a communication module 552, a packet-processing module 554, a packet-constructing module 556, a PIT maintenance module 558, and a packet-seeding module 560. In some embodiments, communication module 552 can send and/or receive data packets (including interests and content objects) to/from other network nodes across a computer network. PIT maintenance module 558 can add an entry in a PIT for a first interest based on an encoded name.

Packet-seeding module 560 can generate a second interest based on a first content object and application logic of a forwarding device. PIT maintenance module 558 can add an entry in a PIT for the second interest, communication module 552 can transmit the second interest to a content producing device. Packet-seeding module 560 can store a received second content object in a cache. Packet-processing module 554 can determine that the first content object indicates a multipart content object. Packet-processing module 554 can further partition the multipart content object into member content objects. Packet-processing module 554 can store the multipart content object and the member content objects in a cache. PIT maintenance module 558 can identify the PIT entry for an encoded name and a corresponding interface, and remove the identified entry from the PIT. Communication module 552 can transmit the multipart content object via an identified interface.

Exemplary Computer and Communication Systems

Figure 6A:
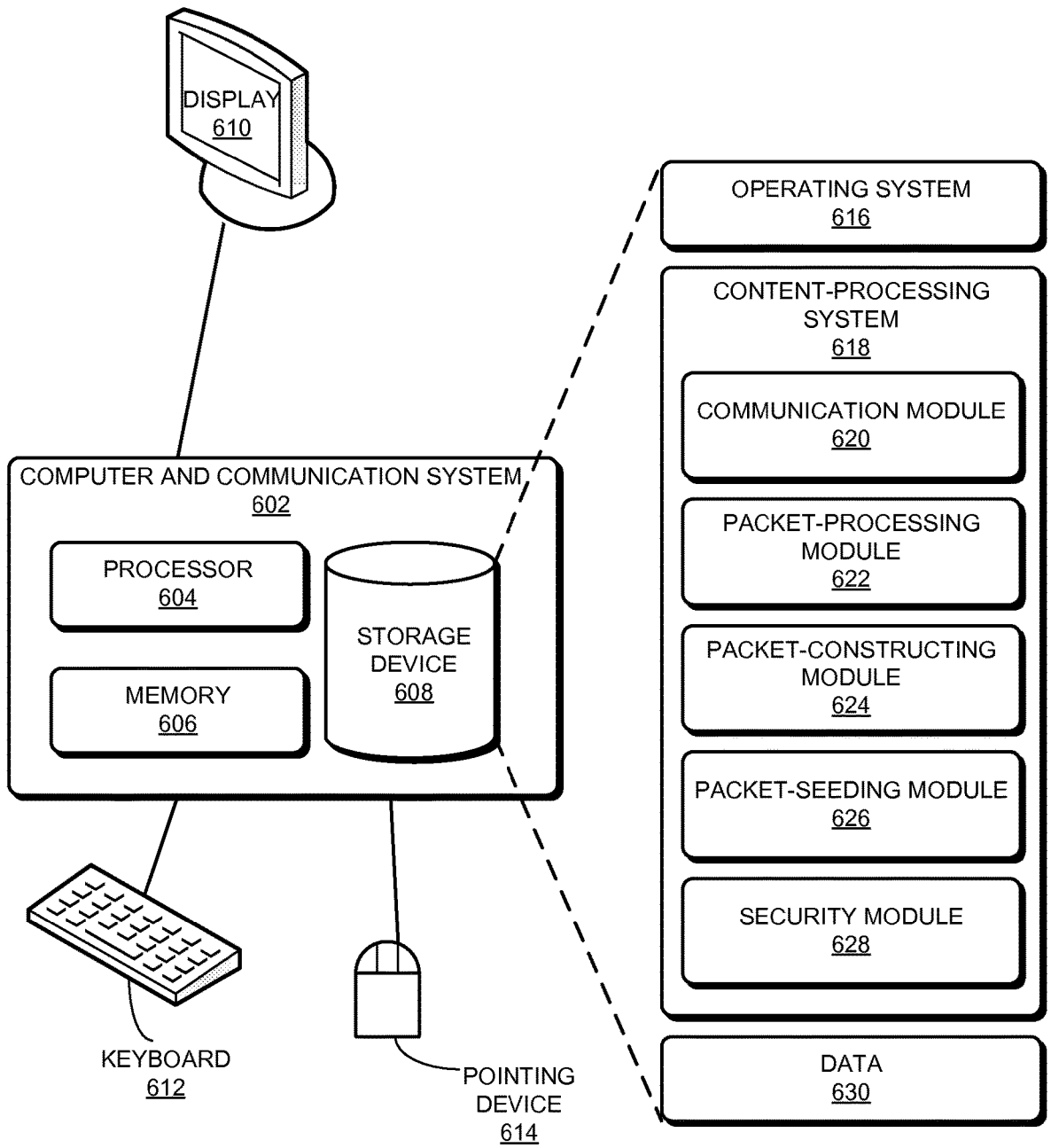
FIG. 6A illustrates an exemplary computer and communication system that facilitates content negotiation in a CCN, in accordance with an embodiment of the present invention.

FIG. 6A illustrates an exemplary computer and communication system 602 that facilitates content negotiation in a CCN, in accordance with an embodiment of the present invention. Computer and communication system 602 includes a processor 604, a memory 606, and a storage device 608. Memory 606 can include a volatile memory (e.g., RAM) that serves as a managed memory, and can be used to store one or more memory pools. Furthermore, computer and communication system 602 can be coupled to a display device 610, a keyboard 612, and a pointing device 614. Storage device 608 can store an operating system 616, a content-processing system 618, and data 630.

Content-processing system 618 can include instructions, which when executed by computer and communication system 602, can cause computer and communication system 602 to perform methods and/or processes described in this disclosure. Specifically, content-processing system 618 may include instructions for receiving, by a content producing device, a packet that corresponds to a first interest, where an encoded name for the interest indicates a plurality of qualifiers for acceptable types of requested content (communication module 620). Content-processing system 618 can include instructions for generating a first content object that satisfies one of the indicated qualifiers, where a name for the content object is the encoded name, and where a content object indicates data and a content type corresponding to the satisfied qualifier (packet-constructing module 624).

Content-processing system 618 can also include instructions for generating a second content object that indicates a multipart content object (packet-constructing module 624), and, responsive to determining that the content producing device can satisfy another qualifier (packet-processing module 622), generating a corresponding content object that satisfies the other qualifier (packet-constructing module 624). Content-processing system 618 can also include instructions for adding the corresponding content object to the multipart content object as a member content object.

Additionally, content-processing system 618 can include instructions for generating an unrequested content object based on a first interest and application logic of a content producing device (packet-seeding module 626), and further transmitting the unrequested content object to a device associated with the first interest (communication module 620). Content-processing system 618 can include instructions for encrypting data associated with a content object based on authentication information, and prepending the authentication information to the corresponding content object (security module 628). Content-processing system 618 can further include instructions for replacing the encrypted data with the authentication information (security module 628).

Content-processing system 618 can further include instructions for generating a third content object that indicates information and a content-specific name to be used in a new interest for content based on an indicated qualifier (packet-constructing module 624). Content-processing system 618 can include instructions for receiving a packet that corresponds to a second interest, where a name for the second interest is the content-specific name indicated in the third content object (communication module 620). Content-processing system 618 can also include instructions for generating a fourth content object that satisfies the second interest, where a name for the fourth content object is the content-specific name for the second interest (packet-constructing module 624).

Data 630 can include any data that is required as input or that is generated as output by the methods and/or processes described in this disclosure. Specifically, data 630 can store at least: a packet that corresponds to a first interest with an encoded name; an encoded name that indicates a plurality of qualifiers for acceptable types of requested content; a name that is an HSVLI; a first content object that satisfies a qualifier indicated in an encoded name; a second content object that is a multipart content object; member content objects as indicated in a multipart content object; a content type; a content name; data representing content; authentication information; a digital certificate; a private key; a shared symmetric key; a public key; a KeyId; an unrequested content object or interest; application logic associated with a content producing device or a forwarding device; a third content object that indicates information and a content-specific name for a subsequent interest; a second interest with an non-encoded name; and a fourth content object corresponding to the second interest.

Figure 6B:
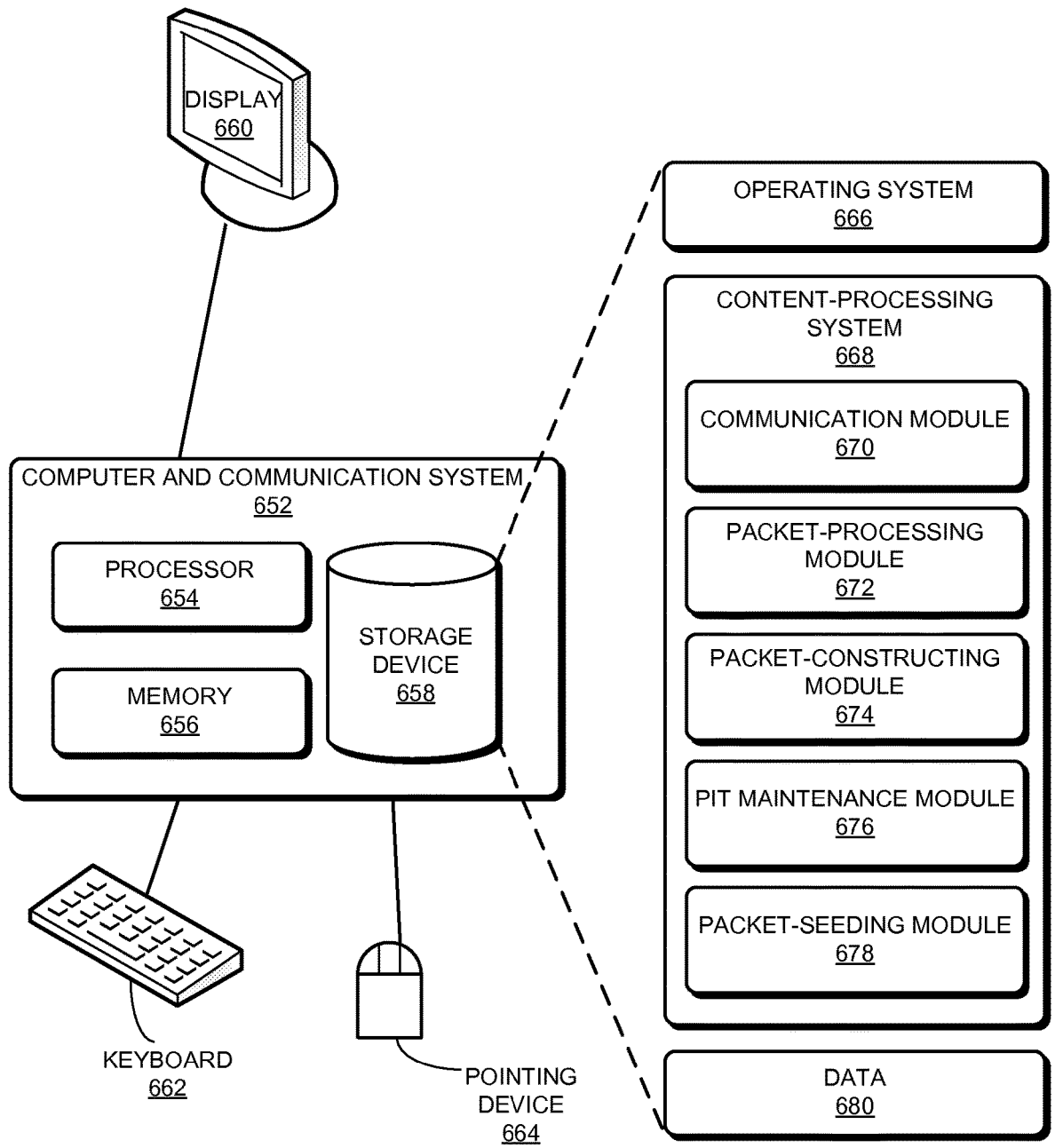
FIG. 6B illustrates an exemplary computer and communication system that facilitates content negotiation in a CCN, in accordance with an embodiment of the present invention.

FIG. 6B illustrates an exemplary computer and communication system 662 that facilitates content negotiation in a CCN, in accordance with an embodiment of the present invention. Computer and communication system 652 includes a processor 654, a memory 656, and a storage device 658. Memory 656 can include a volatile memory (e.g., RAM) that serves as a managed memory, and can be used to store one or more memory pools. Furthermore, computer and communication system 652 can be coupled to a display device 660, a keyboard 662, and a pointing device 664. Storage device 658 can store an operating system 666, a content-processing system 668, and data 680.

Content-processing system 668 can include instructions, which when executed by computer and communication system 652, can cause computer and communication system 652 to perform methods and/or processes described in this disclosure. Specifically, content-processing system 668 may include instructions for receiving, by a forwarding device, a packet that corresponds to a first interest, wherein an encoded name for the interest indicates a plurality of qualifiers for acceptable types of requested content (communication module 670).

Content-processing system 668 can include instructions for adding an entry in a PIT for the first interest based on the encoded name (PIT maintenance module 676). Content-processing system 668 can include instructions for receiving a packet that corresponds to a first content object that satisfies a qualifier (communication module 670). Content-processing system 668 can also include instructions for generating a second interest based on the first content object and application logic of a forwarding device (packet-seeding module 678). Content-processing system 668 can include instructions for adding an entry in the PIT for the second interest (PIT maintenance module 676), and for transmitting the second interest to a content producing device (communication module 670).

Content-processing system 668 can further include instructions for storing a received second content object in a cache (packet-processing module 672). Content-processing system 668 can include instructions for determining that the first content object indicates a multipart content object (packet-processing module 672). Content-processing system 668 can also include instructions for partitioning the multipart content object into member content objects, and for storing the multipart content object and the member content objects in a cache (packet-processing module 672). Content-processing system 668 can also include instructions for identifying the PIT entry for an encoded name and a corresponding interface, and removing the identified entry from the PIT (PIT maintenance module 676), and for transmitting the multipart content object via an identified interface (communication module 670).

Data 680 can include any data that is required as input or that is generated as output by the methods and/or processes described in this disclosure. Specifically, data 630 can store at least: a packet that corresponds to a first interest with an encoded name; an encoded name that indicates a plurality of qualifiers for acceptable types of requested content; a name that is an HSVLI; a first content object that satisfies a qualifier indicated in an encoded name; a second interest based on the first content object and application logic of a forwarding device; a second content object that matches the second interest; a multipart content object; member content objects as indicated in a multipart content object; a content type; a content name; data representing content; a pending interest table (PIT); a PIT entry; and an interface.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for forwarding packets, the computer system comprising:
   a processor; and
   a storage device storing instructions that when executed by the processor cause the processor to perform a method, the method comprising:
      receiving, by a content producing device, a packet that corresponds to a first interest, wherein a plurality of qualifiers for acceptable types of requested content is encoded in a first name associated with the first interest;
      selecting a content negotiation method for the first interest, the content negotiation method selected from a group consisting of an oversupply method, an abstraction method, and a redirection method;
      based on the selected content negotiation method for the first interest, generating a first content object that satisfies at least one of the plurality of qualifiers encoded in the first name, wherein the first content object is identified by the first name, and wherein the first content object includes data with a content type corresponding to the at least one satisfied qualifier;
      forwarding the first content object to a network node that sent the packet that corresponds to the first interest;
      performing an optimization operation by generating an unrequested content object based on the first interest, the unrequested content object satisfying a qualifier that is different than the at least one of the plurality of qualifiers encoded in the first name associated with the first interest; and
      forwarding the unrequested content object to an intermediate network node between the content producing device and the network node that sent the packet that corresponds to the first interest.

2. The computer system of claim 1, wherein the method further comprises:
   encrypting data associated with the first content object based on authentication information; and
   prepending the authentication information to the first content object.

3. The computer system of claim 1, wherein the method further comprises:
   encrypting data associated with the first content object based on authentication information; and
   replacing the encrypted data with the authentication information.

4. The computer system of claim 1, wherein the method further comprises:
   associating a first access control policy with the first content object; and
   associating a second access control policy with a second content object.

5. The computer system of claim 4, wherein the unrequested content object is the second content object associated with the second access control policy.

6. The computer system of claim 1, wherein the method further comprises:
   selecting the oversupply method for the content negotiation method for the first interest;
   generating the first content object as a multipart content object identified by the first name, wherein the first content object includes a plurality of member content objects, and wherein each member content object is identified by a content specific name; and
   generating each member content object to satisfy a corresponding qualifier of the plurality of qualifiers encoded in the first name, wherein each member content object is identified by a corresponding content specific name encoding the corresponding qualifier.

7. A computer system for forwarding packets, the system comprising:
   a processor; and
   a storage device storing instructions that when executed by the processor cause the processor to perform a method, the method comprising;
      receiving, by a content producing device, a packet that corresponds to a first interest, wherein a plurality of qualifiers for acceptable types of requested content is encoded in a first name;
      selecting a redirection method for a content negotiation method of the first interest;
      based on the redirection method selected for the content negotiation method of the first interest, generating a first content object that satisfies at least one of the plurality of qualifiers encoded in the first name, wherein the first content object is identified by the first name, and wherein the first content object indicates at least one content-specific name corresponding to the at least one satisfied qualifier;
      forwarding the first content object to a network node that sent the packet that corresponds to the first interest;
      receiving a packet that corresponds to a second interest, wherein the second interest is associated with a second name selected from the at least one content-specific names indicated in the first content object;
      generating a second content object that satisfies the second interest, wherein the second content object is identified by the second name associated with the second interest;
      forwarding the second content object to a network node that sent the packet that corresponds to the first interest;
      performing an optimization operation by generating an unrequested content object based on the first interest, the unrequested content object satisfying a qualifier that is different than the at least one of the plurality of qualifiers encoded in the first name; and
      forwarding the unrequested content object to an intermediate network node between the content producing device and the network node that sent the packet that corresponds to the first interest.

8. A computer-implemented method for forwarding packets, the method comprising:
   receiving, by a content producing device, a packet that corresponds to a first interest, wherein a plurality of qualifiers for acceptable types of requested content is encoded in a first name associated with the first interest;
   selecting a content negotiation method for the first interest, the content negotiation method selected from a group consisting of an oversupply method, an abstraction method, and a redirection method;
   based on the selected content negotiation method for the first interest, generating a first content object that satisfies at least one of the plurality of qualifiers encoded in the first name, wherein the first content object is identified by the first name, and wherein the first content object includes data with a content type corresponding to the at least one satisfied qualifier;
   forwarding the first content object to a network node that sent the packet that corresponds to the first interest;
   performing an optimization operation by generating an unrequested content object based on the first interest, the unrequested content object satisfying a qualifier that is different than the at least one of the plurality of qualifiers encoded in the first name associated with the first interest; and forwarding the unrequested content object to an intermediate network node between the content producing device and the network node that sent the packet that corresponds to the first interest.

9. The method of claim 8, further comprising:
encrypting data associated with the first content object based on authentication information; and
prepending the authentication information to the first content object.

10. The method of claim 8, further comprising:
encrypting data associated with the first content object based on authentication information; and
replacing the encrypted data with the authentication information.

11. The method of claim 8, further comprising:
associating a first access control policy with the first content object; and
associating a second access control policy with a second content object.

12. The method of claim 11, wherein the unrequested content object is the second content object associated with the second access control policy.

13. The method of claim 8, further comprising:
selecting the oversupply method for the content negotiation method for the first interest;
generating the first content object as a multipart content object identified by the first name, wherein the first content object includes a plurality of member content objects, and wherein each member content object is identified by a content specific name; and
generating each member content object to satisfy a corresponding qualifier of the plurality of qualifiers encoded in the first name, wherein each member content object is identified by a corresponding content specific name encoding the corresponding qualifier.

14. A computer implemented method for forwarding packets, the method comprising:
receiving, by a content producing device, a packet that corresponds to a first interest, wherein a plurality of qualifiers for acceptable types of requested content is encoded in a first name;
selecting a redirection method for a content negotiation method of the first interest;
based on the redirection method selected for the content negotiation method of the first interest, generating a first content object that satisfies at least one of the plurality of qualifiers encoded in the first name, wherein the first content object is identified by the first name, and wherein the first content object indicates at least one content-specific name corresponding to the at least one satisfied qualifier;
receiving a packet that corresponds to a second interest, wherein the second interest is associated with a second name selected from the at least one content-specific names indicated in the first content object;
generating a second content object that satisfies the second interest, wherein the second content object is identified by the second name associated with the second interest;
forwarding the second content object to a network node that sent the packet that corresponds to the first interest;
performing an optimization operation by generating an unrequested content object based on the first interest, the unrequested content object satisfying a qualifier that is different than the at least one of the plurality of qualifiers encoded in the first name; and forwarding the unrequested content object to an intermediate network node between the content producing device and the network node that sent the packet that corresponds to the first interest.

15. An apparatus comprising:
a communication module configured to send and receive data packets to and from network nodes across a computer network; and
a processor configured to:
receive, via the communication module, a packet that corresponds to a first interest, wherein a plurality of qualifiers for acceptable types of requested content is encoded in a first name associated with the first interest;
select a content negotiation method for the first interest, the content negotiation method selected from a group consisting of an oversupply method, an abstraction method, and a redirection method;
based on the selected content negotiation method for the first interest, generate a first content object that satisfies at least one of the plurality of qualifiers encoded in the first name, wherein the first content object is identified by the first name, and wherein the first content object includes data with a content type corresponding to the at least one satisfied qualifier;
cause the communication module to forward the first content object to a network node that sent the packet that corresponds to the first interest;
perform an optimization operation by generating an unrequested content object based on the first interest, the unrequested content object satisfying a qualifier that is different than the at least one of the plurality of qualifiers encoded in the first name associated with the first interest; and
cause the communication module to forward the unrequested content object to an intermediate network node between the apparatus and the network node that sent the packet that corresponds to the first interest.

16. The apparatus of claim 15, wherein the processor is further configured to:
encrypt data associated with the first content object based on authentication information; and
prepend the authentication information to the first content object.

17. The apparatus of claim 15, wherein the processor is further configured to:
encrypt data associated with the first content object based on authentication information; and
replace the encrypted data with the authentication information.

18. The apparatus of claim 15, wherein the processor is further configured to:
associate a first access control policy with the first content object; and
associate a second access control policy with a second content object.

19. The apparatus of claim 18, wherein the unrequested content object is the second content object associated with the second access control policy.

20. The apparatus of claim 15, wherein the processor is further configured to:
select the oversupply method for the content negotiation method for the first interest;

generate the first content object as a multipart content object identified by the first name, wherein the first content object includes a plurality of member content objects, and wherein each member content object is identified by a content specific name; and
generate each member content object to satisfy a corresponding qualifier of the plurality of qualifiers encoded in the first name, wherein each member content object is identified by a corresponding content specific name encoding the corresponding qualifier.

* * * * *